US011102704B2

(12) United States Patent
Tao

(10) Patent No.: US 11,102,704 B2
(45) Date of Patent: Aug. 24, 2021

(54) COMMUNICATION BETWEEN TERMINAL AND BASE STATION, AND NETWORK ACCESS METHOD AND APPARATUS FOR TERMINAL

(71) Applicant: Alibaba Group Holding Limited, Grand Cayman (KY)

(72) Inventor: Zhen Tao, Hangzhou (CN)

(73) Assignee: Alibaba Group Holding Limited, Grorge Town (KY)

(*) Notice: Subject to any disclaimer, the term of this patent is extended or adjusted under 35 U.S.C. 154(b) by 0 days.

(21) Appl. No.: 16/851,939

(22) Filed: Apr. 17, 2020

(65) Prior Publication Data

US 2020/0245227 A1 Jul. 30, 2020

Related U.S. Application Data

(63) Continuation of application No. PCT/CN2018/117107, filed on Nov. 23, 2018.

(30) Foreign Application Priority Data

Nov. 28, 2017 (CN) .......................... 201711218307.9

(51) Int. Cl.
*H04B 7/14* (2006.01)
*H04L 12/24* (2006.01)
(Continued)

(52) U.S. Cl.
CPC ....... *H04W 48/08* (2013.01); *H04W 52/0235* (2013.01); *H04W 88/16* (2013.01)

(58) Field of Classification Search
None
See application file for complete search history.

(56) References Cited

U.S. PATENT DOCUMENTS

2012/0207062 A1* 8/2012 Corbellini ............. H04W 74/08
370/256
2019/0029061 A1* 1/2019 Feng ..................... H04W 72/14

FOREIGN PATENT DOCUMENTS

CN 101998547 A 3/2011
CN 104065452 A 9/2014
(Continued)

OTHER PUBLICATIONS

Translation of international search report for corresponding PCT Application No. PCT/CN2018/117107 dated Feb. 11, 2019, a counterpart foreign application for U.S. Appl. No. 16/851,939, 2 pages.

(Continued)

*Primary Examiner* — Gary Lafontant
(74) *Attorney, Agent, or Firm* — Lee & Hayes, P.C.

(57) ABSTRACT

Communication between a terminal and a base station, and network access methods and apparatuses for a terminal are provided. The communication between the terminal and the base station includes: the terminal sending a network access request frame with a first preamble to a relay device, the relay device being configured to receive the network access request frame according to the first preamble, send the network access request frame with a second preamble to the base station, and receive a network access response frame returned by the base station, a length of the second preamble being smaller than a length of the first preamble; and the terminal receiving the network access response frame sent by the relay device.

20 Claims, 13 Drawing Sheets

(51) Int. Cl.
*H04W 48/08* (2009.01)
*H04W 52/02* (2009.01)
*H04W 88/16* (2009.01)

(56) References Cited

FOREIGN PATENT DOCUMENTS

| CN | 106686558 A | 5/2017 | |
|---|---|---|---|
| WO | WO-2010119370 A1 * | 10/2010 | ............ H04L 12/12 |
| WO | WO2017166138 A1 | 10/2017 | |

OTHER PUBLICATIONS

Translation of written opinion for corresponding PCT Application No. PCT/CN2018/117107 dated Feb. 11, 2019, a counterpart foreign application for U.S. Appl. No. 16/851,939, 4 pages.

* cited by examiner

COMMUNICATION BETWEEN TERMINAL AND BASE STATION, AND NETWORK ACCESS METHOD AND APPARATUS FOR TERMINAL

CROSS REFERENCE TO RELATED PATENT APPLICATIONS

This application claims priority to and is a continuation of PCT Patent Application No. PCT/CN2018/117107 filed on 23 Nov. 2018, and is related to and claims priority to Chinese Patent Application No. 201711218307.9, filed on 28 Nov. 2017 and entitled "Communication between Terminal and Base Station, and Network Access Method and Apparatus for Terminal," which are hereby incorporated by reference in their entirety.

TECHNICAL FIELD

The present application relates to the technical field of communications, and particularly to communication between a terminal and a base station, and network access methods and apparatuses for a terminal.

BACKGROUND

The Internet of Things technology is the third information technology revolution after the computer and the Internet. The Internet of Things has advantages such as timeliness and interactivity, etc., and has widely been used in a number of fields such as city management, digital home, positioning and navigation, logistics management, security systems, etc. LoRa is an ultra-long-distance transmission solution based on spread-spectrum technology in the Internet of Things, and has the characteristics of long transmission distance, low power consumption, multiple nodes, and low cost, etc.

In an existing data transmission method, a LoRa network usually includes a terminal, a base station, and a server.

Generally, an uplink signal of the terminal is directly received by the base station, and a downlink signal of the base station is also directly received by the terminal. However, in some situations, signals of the base station and the terminal cannot reach each other due to attenuation. For example, if the terminal is installed underground, the signal strength will be attenuated, making communications between the base station and the terminal impossible.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the above problems, embodiments of the present disclosure are provided in order to provide a communication method for a terminal and base station, a communication apparatus for a terminal and a base station, a network access method for a terminal, and an network access apparatus for a terminal, to solve the above problems or at least partially solving the above problems.

In order to solve the above problems, the embodiments of the present disclosure disclose a communication method for a terminal and a base station, which includes:

the terminal sending a network access request frame with a first preamble to a relay device, the relay device being configured to receive the network access request frame according to the first preamble, send the network access request frame with a second preamble to the base station, and receive a network access response frame returned by the base station, a length of the second preamble being smaller than a length of the first preamble; and the terminal receiving the network access response frame sent by the relay device.

In implementations, the method further includes:

the terminal sending an uplink data frame with the first preamble to the relay device, the relay device being further configured to receive the uplink data frame according to the first preamble, send the uplink data frame with the second preamble to the base station, and receive a downlink data frame returned by the base station;

the terminal receiving the downlink data frame sent by the relay device.

In implementations, the terminal sending the network access request frame with the first preamble to the relay device includes:

the terminal sending the network access request frame with the first preamble to the relay device, if the terminal does not receive the network access response frame within a first receive window and a second receive window after the network access request frame with the second preamble is sent; or the terminal sending the network access request frame with the first preamble to the relay device, if the terminal receives the network access response frame within the second receive window after sending the network access request frame with the second preamble.

In implementations, the method further includes:

the terminal sending the network access request frame with the second preamble to the base station, if the terminal receives a network access request frame within a first receive window after the network access request frame with the first preamble is sent.

In implementations, the method further includes:

the terminal sending the network access request frame with the second preamble, If the terminal does not receive the network access response frame within a first receive window and a second receive window after the network access request frame with the first preamble is sent.

In implementations, the terminal receiving the network access response frame sent by the relay device includes:

the terminal receiving the network access response frame that is sent by the relay device within a second receive window after the network access request frame with the first preamble is sent.

In implementations, the terminal receiving the downlink data frame sent by the relay device includes:

the terminal receiving the downlink data frame sent by the relay device within a second receive window after the uplink data frame with the first preamble is sent.

The embodiments of the present disclosure further disclose a network access method for a terminal, which includes:

the terminal sending a network access request frame with a second preamble in a normal mode;

the terminal switching from the normal mode to a relay mode, if the terminal receives a network access response frame within a second receive window after the network access request frame with the second preamble is sent;

the terminal sending the network access request frame with a first preamble in a relay mode; a length of the second preamble being smaller than a length of the first preamble; and the terminal switching from the relay mode to the normal mode, if the terminal receives a network access response frame within a first receive window after the network access request frame with the first preamble is sent, or if the terminal does not receive the network access response frame within the first receive window and the second receive window after the network access request frame with the first preamble is sent.

In implementations, the method further includes:

the terminal receiving the network access response frame within the first receive window after sending the network access request frame with the second preamble, and entering a network in the normal mode.

In implementations, the method further includes:

the terminal receiving the network access response frame within the second receive window after the network access request frame with the first preamble is sent, and connecting to a network in the relay mode.

The embodiments of the present disclosure further disclose a communication method for a terminal and a base station, which includes:

the terminal sending an uplink data frame with a second preamble to the base station in a normal mode, if the terminal connects to a network in the normal mode;

the terminal receiving a downlink data frame returned by the base station;

the terminal sending the uplink data frame with a first preamble to the relay device in a relay mode, if the terminal accesses the network in the relay mode, the relay device being configured to use the second preamble to replace the first preamble, and forward the uplink data frame with the second preamble to the base station, a length of the second preamble being shorter than a length of the first preamble; and the terminal receiving a downlink data frame forwarded by the relay device and returned by the base station.

In implementations the terminal receiving the downlink data frame returned by the base station includes:

the terminal receiving the downlink data frame returned by the base station within a first receive window after the uplink data frame with the second preamble is sent.

In implementations, the terminal receiving the downlink data frame forwarded by the relay device and returned by the base station includes:

the terminal receiving the downlink data frame forwarded by the relay device and returned by the base station within a second receive window after the uplink data frame with the first preamble is sent.

The embodiments of the present disclosure further disclose a communication method for a terminal and a base station, which includes:

a relay device receiving a network access request frame with a first preamble sent by the terminal;

the relay device replacing the first preamble with a second preamble, and sending the network access request frame with the second preamble to the base station, a length of the second preamble being shorter than a length of the first preamble; and the relay device receiving a network access response frame returned by the base station, and sending the network access response frame to the terminal.

In implementations, the method further includes:

the relay device receiving an uplink data frame with the first preamble sent by the terminal;

the relay device replacing the first preamble with the second preamble, and sending an uplink data frame with the second preamble to the base station; and the relay device receiving a downlink data frame returned by the base station, and sending the downlink data frame to the terminal.

In implementations, the relay device receiving the network access request frame with the first preamble sent by the terminal includes:

the relay device waking up periodically from an intermittent sleep state, and detecting whether the first preamble is present when waking up; and the relay device receiving the network access request frame after the first preamble is the first preamble is detected.

In implementations, the relay device sending the network access response frame to the terminal includes:

the relay device sending the network access response frame to the terminal within a second receive window after the network access request frame with the first preamble is sent by the terminal; and the relay device entering into the intermittent sleep state after the network access response frame is sent.

In implementations, the relay device receiving the uplink data frame with the first preamble sent by the terminal includes:

the relay device waking up periodically from an intermittent sleep state, and detecting whether the first preamble is present when waking up; and the relay device receiving the uplink data frame after the first preamble if the first preamble is detected.

In implementations, the relay device sending the downlink data frame to the terminal includes:

the relay device sending the downlink data frame to the terminal within a second receive window after the uplink data frame with the first preamble is sent by the terminal; and the relay device entering into the intermittent sleep state after the downlink data frame is sent.

In implementations, a wake-up period of the relay device is shorter than the length of the first preamble.

The embodiments of the present disclosure also disclose a network access method for a terminal, which includes:

a relay device receiving a network access request frame with a first preamble sent by the terminal in a relay mode;

the relay device replacing the first preamble with a second preamble, and sending the network access request frame with the second preamble to the base station, a length of the second preamble being shorter than a length of the first preamble; and the relay device receiving a network access response frame returned by the base station, and sending the network access response frame to the terminal.

In implementations, the relay device receiving the network access request frame with the first preamble sent by the terminal in the relay mode includes:

the relay device waking up periodically from an intermittent sleep state, and detecting whether the first preamble is present when waking up; and the relay device receiving the network access request frame after the first preamble if the first preamble is detected.

In implementations, the relay device sending the network access response frame to the terminal includes:

the relay device sending the network access response frame to the terminal within a second receive window after the network access request frame with the first preamble is sent by the terminal; and the relay device entering into the intermittent sleep state after the network access response frame is sent.

In implementations, a wake-up period of the relay device is shorter than the length of the first preamble.

The embodiments of the present disclosure further disclose a communication method for a terminal and a base station, which includes:

a relay device receiving an uplink data frame with a first preamble sent by the terminal that connects to a network in a relay mode;

the relay device replacing the first preamble with a second preamble, and sending the uplink data frame with the second preamble to the base station, a length of the second preamble being shorter than a length of the first preamble; and the relay device receiving a downlink data frame returned by the base station, and forwarding the downlink data frame to the terminal.

In implementations, the relay device receiving the uplink data frame with the first preamble sent by the terminal that connects to the network in the relay mode includes:

the relay device waking up periodically from an intermittent sleep state, and detecting whether the first preamble is present when waking up; and the relay device receiving the uplink data frame after the first preamble if the first preamble is detected.

In implementations, the relay device forwarding the downlink data frame to the terminal includes:

the relay device sending the downlink data frame to the terminal within a second receive window after the uplink data frame with the first preamble is sent by the terminal;

the relay device entering into the intermittent sleep state after the downlink data frame is sent.

In implementations, a wake-up period of the relay device is shorter than the length of the first preamble.

The embodiments of the present disclosure further disclose a communication apparatus for a terminal and a base station, which includes:

a first preamble request frame sending module located at the terminal, configured to send a network access request frame with a first preamble to a relay device, the relay device being configured to receive the network access request frame according to the first preamble, send the network access request frame with a second preamble to the base station, and receive a network access response frame returned by the base station, the length of the second preamble being shorter than the length of the first preamble; and a network access response frame receiving module located at the terminal, configured to receive the network access response frame sent by the relay device.

In implementations, the apparatus further includes:

a first preamble data frame sending module located at the terminal, configured to send an uplink data frame with the first preamble to the relay device, the relay device being further configured to receive the uplink data frame according to the first preamble, send the uplink data frame with the second preamble to the base station, and receive a downlink data frame returned by the base station; and a downlink data frame receiving module located at the terminal, configured to receive the downlink data frame sent by the relay device.

In implementations, the first preamble request frame sending module includes:

a first preamble request frame sending sub-module, configured to cause the terminal to send the network access request frame with the first preamble to the relay device, if the terminal does not receive the network access response frame within a first receive window and a second receive window after the network access request frame with the second preamble is sent; or a second preamble request frame sending sub-module, configured to cause the terminal to send the network access request frame with the first preamble to the relay device, if the terminal receives the network access response frame within the second receive window after the network access request frame with the second preamble is sent.

In implementations, the apparatus further includes:

a third preamble request frame sending module located at the terminal, configured to send the network access request frame with the second preamble to the base station, if the terminal receives the network access request frame within a first receive window after the network access request frame with the first preamble is sent.

In implementations, the apparatus further includes:

a fourth preamble request frame sending module located at the terminal, configured to send the network access request frame with the second preamble to the base station, if the terminal does not receive network access response frame within a first receive window and a second receive window after the network access request frame with the first preamble is sent.

In implementations, the network access response frame receiving module includes:

a network access response frame receiving sub-module configured to receive the network access response frame sent by the relay device within a second receive window after the network access request frame with the first preamble is sent.

In implementations, the downlink data frame receiving module includes:

a downlink data frame receiving sub-module configured to receive the downlink data frame sent by the relay device within a second receive window after the uplink data frame with the first preamble is sent.

The embodiments of the present disclosure further disclose a network access apparatus for a terminal, which includes:

a second preamble request frame sending module located at the terminal, configured to send a network access request frame with a second preamble in a normal mode;

a first mode switching module located at the terminal, configured to switch from the normal mode to a relay mode if the terminal receives a network access response frame within a second receive window after the network access request frame with the second preamble is sent;

a first preamble request frame sending module located at the terminal, configured to send the network access request frame with a first preamble in a relay mode, a length of the second preamble being shorter than a length of the first preamble; and a second mode switching module located at the terminal, configured to switch from the relay mode to the normal mode, if the terminal receives the network access response frame within a first receive window after the network access request frame with the first preamble is sent, or if the terminal does not receive the network access response frame within the first receive window and the second receive window after the network access request frame with the first preamble is sent.

In implementations, the apparatus further includes:

a first network access response frame receiving module located at the terminal, configured to receive the network access response frame within the first receive window after sending the network access request frame with the second preamble, and connect to a network in the normal mode.

In implementations, the apparatus further includes:

a first network access response frame receiving module located at the terminal, configured to receive the network access response frame within the second receive window after sending the network access request frame with the first preamble, and connect to a network in the relay mode.

The embodiments of the present disclosure further disclose a communication apparatus for a terminal and a base station, which includes:

a second preamble data frame sending module located at the terminal, configured to send an uplink data frame with the second preamble to the base station in the normal mode if the terminal accesses the network in the normal mode;

a first downlink data frame receiving module located at the terminal, configured to receive a downlink data frame returned by the base station;

a first preamble data frame sending module located at the terminal, configured to send the uplink data frame with the first preamble to a relay device in the relay mode if the terminal accesses the network in the relay mode, the relay device being configured to replace the first preamble with the second preamble, and forward the uplink data frame with the second preamble to the base station, a length of the second preamble being shorter than a length of the first preamble; and a second downlink data frame receiving module located at the terminal, configured to receive the downlink data frame forwarded by the relay device and returned by the base station.

In implementations, the first downlink data frame receiving module includes:

a first downlink data frame receiving sub-module, configured to receive the downlink data frame returned by the base station within the first receive window after the uplink data frame with the second preamble is sent.

In implementations, the second downlink data frame receiving module includes:

a second downlink data frame receiving sub-module, configured to receive the downlink data frame returned by the relay device and returned by the base station within the second receive window after the uplink data frame with the first preamble is sent.

The embodiments of the present disclosure further disclose a communication apparatus for a terminal and a base station, which includes:

a first preamble request frame receiving module located at a relay device, configured to receive a network access request frame with a first preamble sent by the terminal;

a first preamble request frame forwarding module located at the relay device, configured to replace the first preamble with a second preamble, and send the network access request frame with the second preamble to the base station, a length of the second preamble being shorter than a length of the first preamble; and a network access response frame forwarding module located at the relay device, configured to receive a network access response frame returned by the base station, and send the network access response frame to the terminal.

In implementations, the apparatus further includes:

a first preamble data frame receiving module located at the relay device, configured to receive an uplink data frame with the first preamble sent by the terminal;

a first preamble data frame forwarding module located at the relay device, configured to replace the first preamble with the second preamble, and send an uplink data frame with the second preamble to the base station; and a downlink data frame forwarding module located at the relay device, configured to receive a downlink data frame returned by the base station and send the downlink data frame to the terminal.

In implementations, the first preamble request frame receiving module includes:

a first preamble detection sub-module, configured to periodically wake up from an intermittent sleep state, and detect whether the first preamble is present when waking up; and a first preamble request frame receiving sub-module, configured to receive the network access request frame after the first preamble if the first preamble is detected.

In implementations, the network access response frame forwarding module includes:

a network access response frame forwarding sub-module, configured to send the network access response frame to the terminal within a second receive window after the network access request frame with the first preamble is sent by the terminal; and a first sleep sub-module, configured to enter into the intermittent sleep state after sending the network access response frame.

In implementations, the first preamble data frame receiving module includes:

a second preamble detection sub-module, configured to periodically wake up from an intermittent sleep state, and detect whether the first preamble is present when waking up; and a first preamble data frame receiving sub-module, configured to receive the uplink data frame after the first preamble if the first preamble is detected.

In implementations, the downlink data frame forwarding module includes:

a downlink data frame forwarding sub-module, configured to send the downlink data frame to the terminal within a second receive window after the uplink data frame with the first preamble is sent by the terminal; and a second sleep sub-module, configured to enter into the intermittent sleep state after the downlink data frame is sent.

In implementations, a wake-up period of the relay device is shorter than the length of the first preamble.

The embodiments of the present disclosure further disclose a network access apparatus for a terminal, which includes:

a first preamble request frame receiving module located at a relay device, configured to receive a network access request frame with a first preamble sent by the terminal in a relay mode;

a first preamble request frame forwarding module located at the relay device, configured to replace the first preamble with a second preamble, and send the network access request frame with the second preamble to a base station, a length of the second preamble being shorter than a length of the first preamble; and a network access response frame forwarding module located at the relay device, configured to receive a network access response frame returned by the base station, and send the network access response frame to the terminal.

In implementations, the first preamble request frame receiving module includes:

a first preamble detection sub-module, configured to periodically wake up from an intermittent sleep state, and detect whether the first preamble is present when waking up; and a first preamble request frame receiving sub-module is configured to cause the relay device to receive the network access request frame after the first preamble if the first preamble is detected.

In implementations, the network access response frame forwarding module includes:

a network access response frame forwarding sub-module, configured to send the network access response frame to the terminal within the second receive window after the network access request frame with the first preamble is sent by the terminal; and a sleep sub-module, configured to enter into the intermittent sleep state after the network access response frame is sent.

In implementations, a wake-up period of the relay device is shorter than the length of the first preamble.

The embodiments of the present disclosure further disclose a communication apparatus for a terminal and a base station, which includes:

a first preamble data frame receiving module located at a relay device, configured to receive an uplink data frame with a first preamble sent by a terminal that connects to a network in a relay mode;

a first preamble data frame forwarding module located at the relay device, configured to replace the first preamble with a second preamble, and send the uplink data frame with the second preamble to the base station, a length of the second preamble being shorter than a length of the first preamble; and a downlink data frame forwarding module located at the relay device, configured to receive a downlink data frame returned by the base station, and forward the downlink data frame to the terminal.

In implementations, the first preamble data frame receiving module includes:

a first preamble detection sub-module, configured to periodically wake up from an intermittent sleep state, and detect whether the first preamble is present when waking up;

a first preamble data frame receiving sub-module is configured to cause the relay device to receive the uplink data frame after the first preamble if the first preamble is detected.

In implementations, the downlink data frame forwarding module includes:

a downlink data frame forwarding sub-module, configured to send the downlink data frame to the terminal within a second receive window after the uplink data frame with the first preamble is sent by the terminal; and a sleep sub-module, configured to enter into the intermittent sleep state after the downlink data frame is sent.

In implementations, a wake-up period of the relay device is shorter than the length of the first preamble.

The embodiments of the present disclosure further disclose an apparatus, which includes:

one or more processors; and one or more machine-readable media having instructions stored thereon that, when executed by the one or more processors, cause the apparatus to perform one or more of the methods as described above.

The embodiments of the present disclosure also disclose one or more machine-readable media having instructions stored thereon that, when executed by one or more processors, cause an apparatus to perform one or more of the methods described above.

The embodiments of the present disclosure include the following advantages:

In implementations, a terminal may send a network access request frame with a first preamble to a relay device, and the relay device forwards the network access request frame to a base station. The relay device then sends a network access response frame returned by the base station to the terminal, thus completing a process of network access for the terminal.

After the terminal connects to a network through the relay device, the terminal can send an uplink data frame with the first preamble to the relay device. The relay device forwards the uplink data frame to the base station, and then the relay device sends a downlink data frame returned by the base station to the terminal, thus completing a process of communication between the terminal and the base station.

In implementations, the terminal may access the network through the relay device and communicate with the base station. In implementations, a LoRaWAN radio frame format of the terminal is not changed, and only a length of a preamble is increased. Such relay device does not adopt a private frame structure, and is highly compatible with the LoRaWAN standard, providing a guarantee of a unified LoRa relay standard for various manufacturers.

DETAILED DESCRIPTION

In order to make the above-mentioned objects, features, and advantages of the present disclosure more comprehensible, the present disclosure will be described in further detail hereinafter with reference to the accompanying drawings and specific embodiments.

A LoRa network is formed by terminal nodes, base station nodes, and servers. A terminal has a LoRa network connection capability, and accesses the LoRa network. According to different application scenarios deployed on the LoRa network, the terminals may include different electronic devices. For example, when the LoRa network is used in city management, the terminal may include a smart meter. When the LoRa network is used in a digital home, the terminals may include various smart home appliances, etc.

A base station, also known as a gateway or concentrator in the LoRa network, has functions of wireless connection and aggregation, which include providing an entry for a terminal to access to the LoRa network, forwarding data from a server or a terminal, and realizing data interactions between the terminal and the server. Apparently, the base station can also perform data interactions with other base stations within a signal coverage range of the base station by transmitting wireless frames.

A server may include a server or a server cluster, and is configured to perform service processing according to data obtained from a base station or a terminal, and control a working mode and a working state of the base station or the terminal.

In implementations, a LoRa relay device is set up between a terminal and a base station, and communication is established between the terminal and the base station through the LoRa relay device.

A process of communication between a terminal and a base station is first introduced below from the perspective of the terminal.

Figure 1:
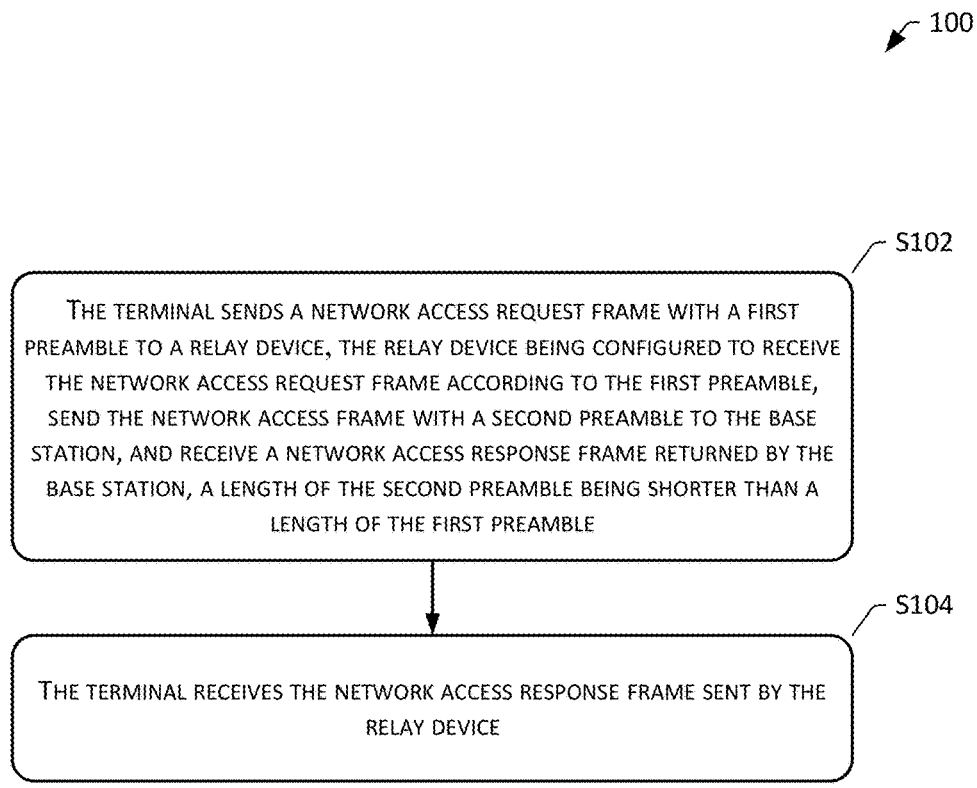
FIG. 1 is a flowchart of a communication method for a terminal and a base station according to the embodiments of the present disclosure.

Referring to FIG. 1, a flowchart of a communication method 100 for a terminal and a base station according to the embodiments of the present disclosure is shown. In implementations, the method 100 may include the following steps.

S102: The terminal sends a network access request frame with a first preamble to a relay device, the relay device being configured to receive the network access request frame according to the first preamble, send the network access frame with a second preamble to the base station, and receive a network access response frame returned by the base station, a length of the second preamble being shorter than a length of the first preamble.

During a standard process of network access, a terminal sends a network access request frame with a second preamble to a base station. If the terminal can receive a network access response frame returned by the base station, the standard network access is successful.

However, when the mutual signal strength between the terminal and the base station is insufficient, the network access request frame sent by the terminal cannot reach the base station, or the network access response frame returned by the base station cannot reach the terminal. In this case, the standard network access fails.

In implementations, a LoRa relay device is provided between a terminal and a base station, and communication between the terminal and the base station can be established through the relay device.

For example, a terminal is buried under the ground, which is 500 meters from a base station. If the terminal cannot receive a signal of the base station due to obstacle(s) on the ground, then the relay device can be placed on the ground above a buried point of the terminal to play the role of signal relay.

In implementations, the relay device, which acts as a standard node, first connects to the LoRa network according to a standard process of network access. In other words, the relay device first sends a network access request frame with a second preamble to the base station, and then receives a network access response frame returned by the base station. After the standard network access is successful, the relay device enters into an intermittent sleep state to save power consumption.

When a standard process of network access taken by the terminal fails, the terminal may send a network access request frame with a first preamble to the relay device that has connected to the network.

A preamble is a regular wireless signal, which is used for informing a wireless receiver that a subsequent wireless signal includes valid information.

In implementations, a second preamble and a first preamble are both wireless signals before a network access request frame.

The second preamble is a standard preamble, which is a preamble in a standard format specified by the LoRaWAN protocol. The first preamble is a long preamble, and a length of the first preamble is longer than a length of the second preamble. The length of the preamble may include a time duration.

Another purpose of the first preamble is to activate a wireless receiver that is in a sleep mode. Therefore the length thereof is longer than that of the second preamble. For example, a sleep period of a receiver is 4 seconds, and the length of the first preamble needs to be at least 4 seconds.

In implementations, the relay device periodically wakes up from an intermittent sleep state. When the relay device wakes up, the relay device detects whether a first preamble is present. If a first preamble is detected, the relay device activates a data receiving function and receives a radio frame after the first preamble.

In implementations, S102 may include:

the terminal sending a network access request frame with a first preamble to the relay device if the terminal does not receive the network access response frame within a first receive window and a second receive window after the network access request frame with the second preamble is sent; or the terminal sending a network access request frame with a first preamble to the relay device if the terminal receives the network access response frame within the second receive window after the network access request frame with the second preamble is sent.

According to the LoRaWAN protocol, after each uplink transmission, the terminal needs to open two short receive windows: a first receive window RX (receive) 1 and a second receive window RX2. Respective starting times of the first receive window and the second receive window are set based on an ending time of uplink transmission.

In implementations, the relay device is set to make downlink transmission to the terminal within the second receive window after the terminal makes upstream transmission.

In implementations, if the terminal does not receive the network access response frame within the first receive window and the second receive window after sending the network access request frame with the second preamble, the standard network access is considered to have failed. At this time, the terminal sends a network access request frame with the first preamble to the relay device.

In implementations, if the terminal receives the network access response frame within the second receive window after sending the network access request frame with the second preamble, the standard network access is considered to have failed. At this time, the terminal sends a network access request frame with the first preamble to the relay device.

Only when the terminal receives the network access response frame within the first receive window after sending the network access request frame with the second preamble, the standard network access is considered to be successful.

In implementations, the method may further include:

if the terminal receives a network access request frame within a first receive window after sending the network access request frame with the first preamble, the terminal sending a network access request frame with a second preamble to the base station.

In implementations, if the terminal receives a network access request frame sent by the base station within a first receive window after sending the network access request frame with the first preamble, the signal strength between the terminal and the base station is considered to be communicable. The terminal may initiate the standard process of network access again, and send a network access request frame with a second preamble to the base station.

In implementations, the method may further include:

if the terminal does not receive a network access response frame within the first receive window and the second receive window after sending the network access request frame with the first preamble, the terminal sending a network access request frame with a second preamble.

In implementations, if the terminal does not receive a network access request frame in the first receive window and the second receive window after sending the network access request frame with the first preamble, a process of network access through the relay device is considered to have failed. The terminal can initiate a standard process of network access to the base station again after sleeping for a period of time.

Only when the terminal receives a network access response frame within the second receive window after sending the network access request frame with the first preamble, the terminal is considered to be successfully connected to the network through the relay device.

In implementations, after the relay device receives the network access request frame with the first preamble sent by the terminal, the relay device replaces the first preamble in front of the network access request frame with the second preamble, and then forwards the network access request frame with the second preamble to the base station.

After receiving the network access request frame forwarded by the relay device, the base station returns a network access response frame to the relay device. The network access response frame also carries the second preamble, and the relay device receives the network access response frame according to the preamble. Finally, the relay device returns the network access response frame with the second preamble to the terminal, and the terminal successfully connects to the network.

S104: The terminal receives the network access response frame sent by the relay device.

After receiving the network access response frame forwarded by the relay device, the terminal completes network access.

In implementations, S104 may include:

the terminal receiving the network access response frame sent by the relay device within a second receive window after sending the network access request frame with the first preamble.

In implementations, the relay device makes downlink transmission to the terminal within the second receive window after the terminal makes upstream transmission.

Therefore, the terminal can receive the network access response frame sent by the relay device within the second receive window after sending the network access request frame with the first preamble.

In implementations, the method may further include: the terminal sending an uplink data frame with the first preamble to the relay device after receiving the network access response frame, the relay device being further configured to receive the uplink data frame according to the first preamble, send the uplink data frame with the second preamble to the base station, and receive a downlink data frame returned by the base station.

After the terminal successfully connects to the network through the relay device, each uplink data frame that is sent needs to carry with the first preamble. The relay device needs to receive the uplink data frame according to the first preamble.

After receiving the uplink data frame, the relay device replaces the first preamble that is in front of the uplink data frame with the second preamble, and then sends the uplink data frame with the first preamble to the base station.

After receiving the uplink data frame, the base station returns a downlink data frame with the second preamble to the relay device, and the relay device forwards the downlink data frame with the second preamble to the terminal.

In implementations, the method may further include: the terminal receiving the downlink data frame sent by the relay device.

The terminal receives the downlink data frame forwarded by the relay device from the base station, thereby completing communications between the terminal and the base station.

In implementations, the terminal receiving the downlink data frame sent by the relay device may include:

the terminal receiving the downlink data frame sent by the relay device within a second receive window after sending the uplink data frame with the first preamble.

In implementations, the relay device makes downlink transmission to the terminal within the second receive window after the terminal makes upstream transmission.

Therefore, the terminal can receive the downlink data frame sent by the relay device within the second receive window after sending the uplink data frame with the first preamble.

In implementations, the terminal may send a network access request frame with a first preamble to the relay device, and the relay device forwards the network access request frame to the base station. The relay device sends a network access response frame returned by the base station to the terminal to complete a process of network access of the terminal.

After the terminal connects to the network through the relay device, the terminal can send an uplink data frame with a first preamble to the relay device, and the relay device forwards the uplink data frame to the base station. The relay device then sends a downlink data frame returned by the base station to the terminal to complete a process of communication between the terminal and the base station.

In implementations, a terminal may access the network through a relay device and communicate with a base station. In implementations, a LoRaWAN radio frame format of the terminal is not changed, and only a length of a preamble is increased. Such relay device does not use a private frame structure, and is highly compatible with the LoRaWAN standard, providing a guarantee of a unified LoRa relay standard for various manufacturers.

A process of network access of a terminal is described below from the perspective of the terminal.

Figure 2:
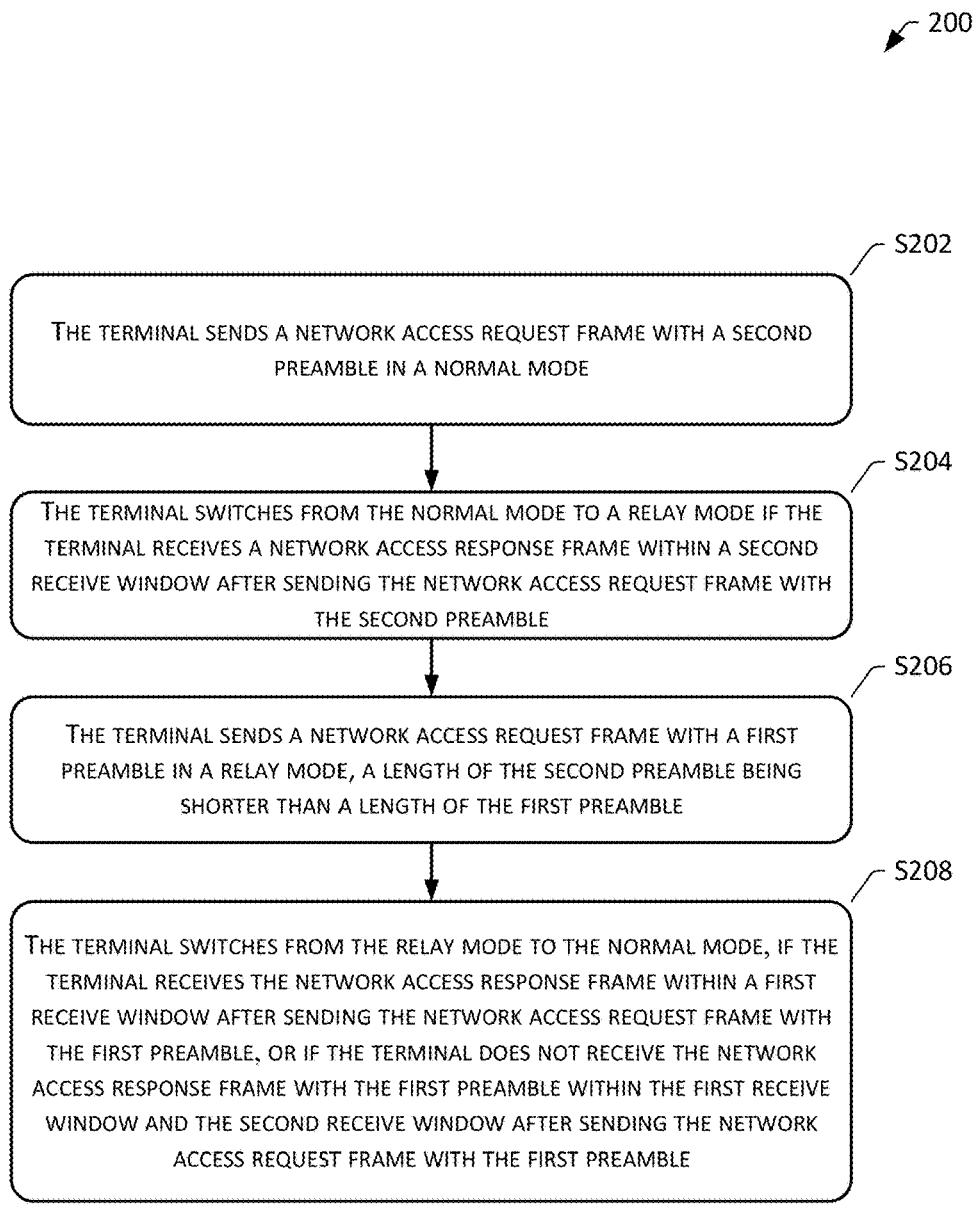
FIG. 2 is a flowchart of a network access method for a terminal according to the embodiments of the present disclosure.

Referring to FIG. 2, a flowchart of a network access method 200 for a terminal according to the embodiments of the present disclosure is shown. In implementations, the method 200 may include the following steps.

S202: The terminal sends a network access request frame with a second preamble in a normal mode.

In implementations, the terminal has two working modes which are a normal mode and a relay mode. The terminal can initiate a process of network access in the normal mode or the relay mode.

If the terminal initiates the process of network access in the normal mode, the terminal may first send a network access request frame with a second preamble to a base station. A sending method may be a broadcasting or unicasting method, for example.

S204: The terminal switches from the normal mode to a relay mode if the terminal receives a network access response frame within a second receive window after sending the network access request frame with the second preamble.

In implementations, a relay device is required to send data to the terminal within a second receive window after the terminal makes upstream transmission.

If the terminal receives a network access response frame within the second receive window after sending the network access request frame with the second preamble in the normal mode, the network access response frame can be considered to be forwarded by the relay device instead of being directly received from the base station. At this time, the terminal switches from the normal mode to a relay mode, and initiates a process of network access in the relay mode.

In implementations, the method 200 may further include:

the terminal receiving the network access response frame within a first receive window after sending the network access request frame with the second preamble, and connecting to a network in the normal mode.

If the terminal receives the network access response frame in the first receive window after sending the network access request frame with the second preamble in the normal mode, the network access response frame can be considered to be directly received and sent. At this time, the terminal connects to the network in normal mode.

S206: The terminal sends a network access request frame with a first preamble in a relay mode, a length of the second preamble being shorter than a length of the first preamble.

If the terminal initiates a process of network access in a relay mode, the terminal may first send a network access request frame with a first preamble to the relay device. A sending method may be a broadcasting or unicasting method.

S208: The terminal switches from the relay mode to the normal mode, if the terminal receives the network access response frame within a first receive window after sending the network access request frame with the first preamble, or if the terminal does not receive the network access response frame with the first preamble within the first receive window and the second receive window after sending the network access request frame with the first preamble.

If the terminal receives the network access response frame within the first receive window after sending the network access request frame with the first preamble in the relay mode, the network access response frame may be considered to be directly received and directly sent. At this point, the terminal can switch to the normal mode and attempt to access the network in the normal mode.

If the terminal does not receive the network access response frame within the first receive window and the second receive window after sending the network access request frame with the first preamble in the relay mode, the process of network access through the relay device is then considered to have failed. The terminal can initiate a standard process of network access to the base station again after sleeping for a period of time.

In implementations, the method 200 may further include:

the terminal receiving the network access response frame within the second receive window after sending the network access request frame with the first preamble, and connecting to the network in the relay mode.

Only when the terminal receives the network access response frame within the second receive window after sending the network access request frame with the first preamble, the terminal is considered to be successfully connected to the network through the relay device.

In implementations, the terminal may send a network access request frame with a first preamble to the relay device, the relay device forwards the network access request frame to the base station. The relay device then sends a network access response frame returned by the base station to the terminal to complete a process of network access of the terminal.

A communication process after a terminal connects to a network is described below from the perspective of the terminal.

Figure 3:
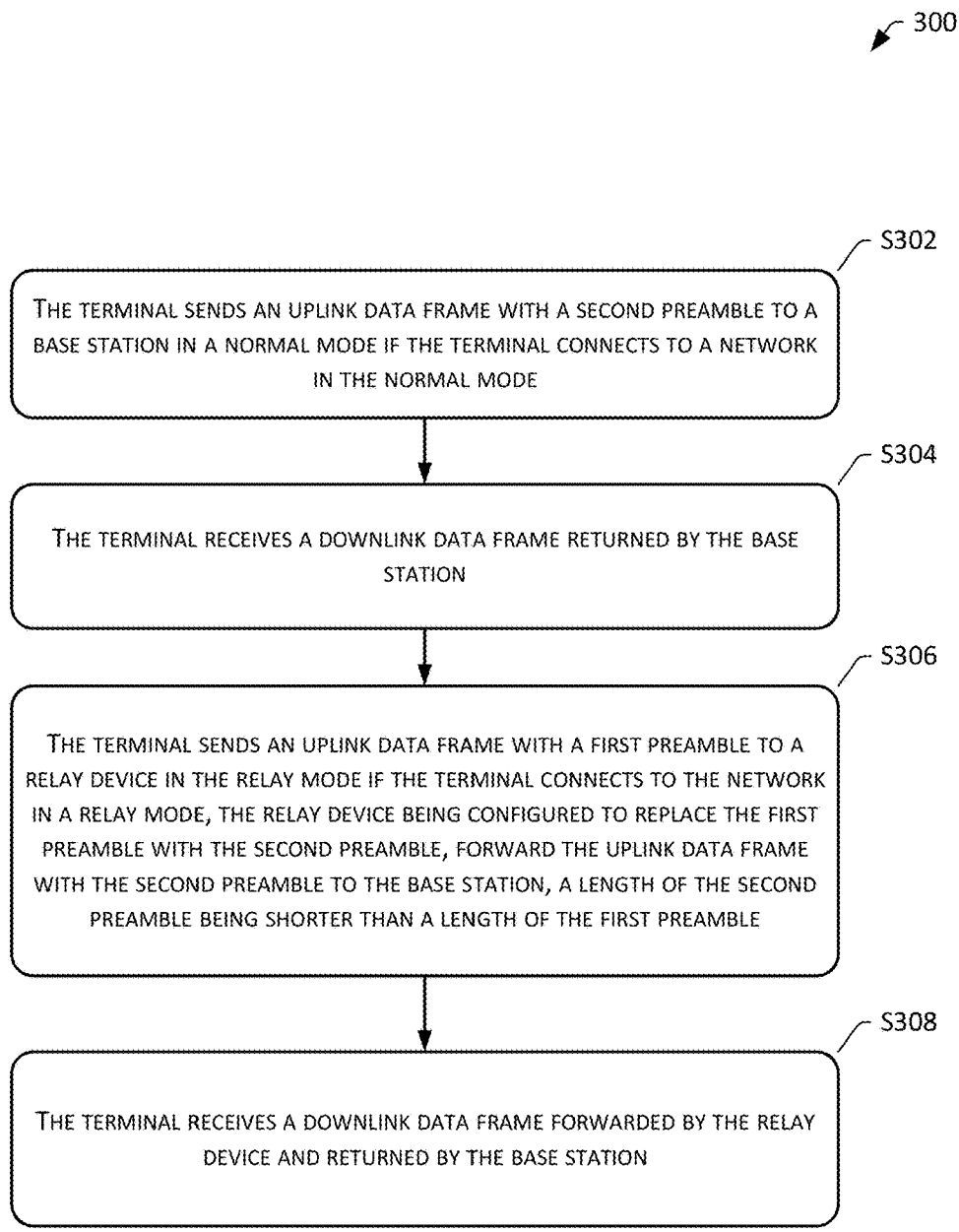
FIG. 3 is a flowchart of a communication method for a terminal and a base station according to the embodiments of the present disclosure.

Referring to FIG. 3, a flowchart of a communication method 300 for a terminal and a base station according to the embodiments of the present disclosure is shown. In implementations, the method 300 may include the following steps:

S302: The terminal sends an uplink data frame with a second preamble to a base station in a normal mode if the terminal connects to a network in the normal mode.

In implementations, the terminal has two working modes which are a normal mode and a relay mode. The terminal can initiate a process of network access in the normal mode or the relay mode.

If the terminal has already connected to the network in the normal mode, a data uplink method of the terminal is to add a second preamble before the uplink data frame, and then send the uplink data frame with the second preamble to the base station.

S304: The terminal receives a downlink data frame returned by the base station.

The terminal directly receives the downlink data frame returned by the base station.

In implementations, S304 may include:

the terminal receiving the downlink data frame returned by the base station within a first receive window after the uplink data frame with the second preamble is sent.

The terminal may directly receive the downlink data frame returned by the base station within a first receive window after the uplink data frame with the second preamble is sent in the normal mode.

S306: The terminal sends an uplink data frame with a first preamble to a relay device in the relay mode if the terminal connects to the network in a relay mode, the relay device being configured to replace the first preamble with the second preamble, forward the uplink data frame with the second preamble to the base station, a length of the second preamble being shorter than a length of the first preamble.

If the terminal is already connected to the network in a relay mode, a data uplink method of the terminal is to add a first preamble before the uplink data frame, and then send the uplink data frame with the first preamble to the relay device.

After receiving the uplink data frame, the relay device replaces the first preamble with the second preamble, and forwards the uplink data frame with the second preamble to the base station.

S308: The terminal receives a downlink data frame forwarded by the relay device and returned by the base station.

The terminal receives a downlink data frame forwarded by the relay device and sent by the base station.

In implementations, S308 may include:

the terminal receiving the downlink data frame returned by the relay device and returned by the base station within a second receive window after the uplink data frame with the first preamble is sent.

In implementations, the relay device is required to initiate a downlink transmission to the terminal within a second receive window after the terminal makes upstream transmission.

The terminal may receive the downlink data frame forwarded by the relay device and returned from the base station within the second receive window after the uplink data frame with the first preamble is transmitted in the relay mode.

In implementations, after the terminal connects to a network through the relay device, the terminal may forward an uplink data frame with a first preamble to the relay device. The relay device forwards the uplink data frame to the base station, and then sends a downlink data frame returned by the base station to the terminal, thus completing a process of communication between the terminal and the base station.

A process of communication between a terminal and a base station is first described below from the perspective of a relay device.

Figure 4:
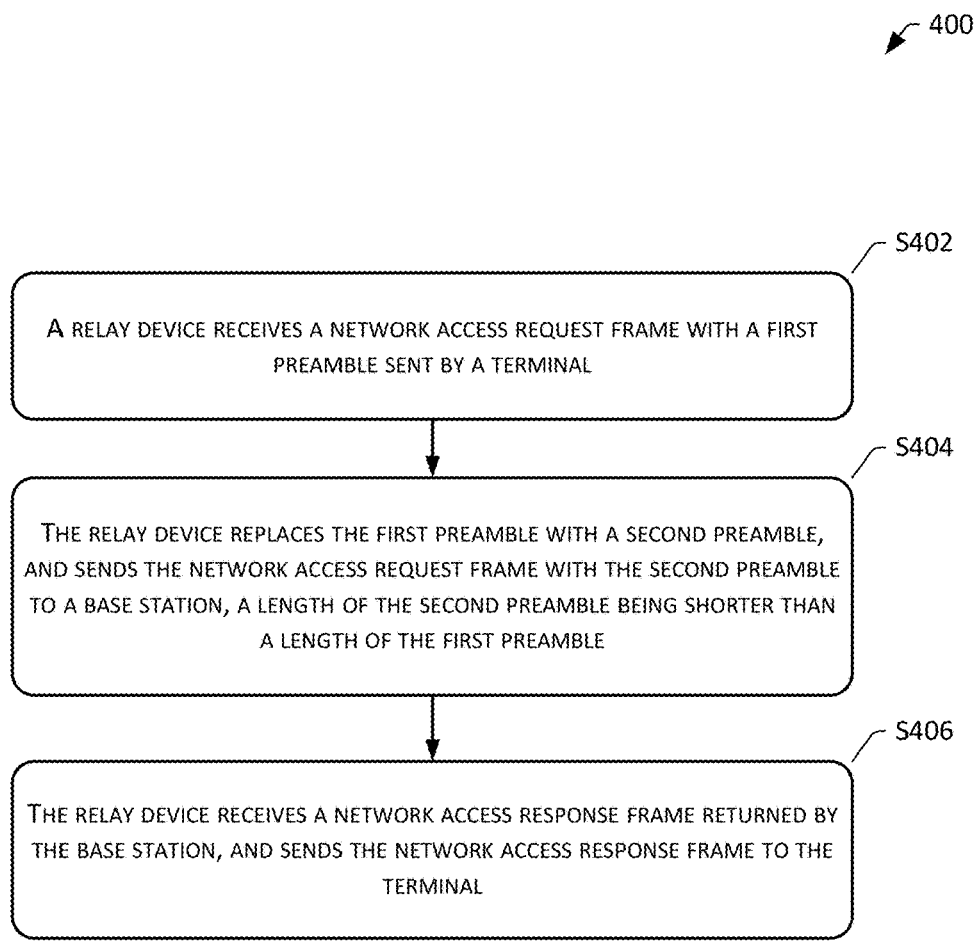
FIG. 4 is a flowchart of a communication method for a terminal and a base station according to the embodiments of the present disclosure.

Referring to FIG. 4, a flowchart of a communication method 400 for a terminal and a base station according to the embodiments of the present disclosure is shown. In implementations, the method 400 may include the following steps.

S402: A relay device receives a network access request frame with a first preamble sent by a terminal.

In implementations, a LoRa relay device is deployed between a terminal and a base station, and communications between the terminal and the base station can be established through the relay device.

After a standard process of network access fails, the terminal can initiate a process of network access to the relay device. First, the terminal sends a network access request frame with a first preamble to the relay device.

In implementations, the relay device may have a CAD (channel activity detection) mode.

The channel activity detection mode is designed to detect a LoRa preamble on a wireless channel with the highest possible power consumption efficiency. In the CAD mode, the relay device quickly scans a frequency band to detect a preamble of a LoRa radio frame.

In implementations, S402 may include:

the relay device periodically waking up from an intermittent sleep state, and detects whether a first preamble is present when waking up; and the relay device receiving a network access request frame after the first preamble, if the first preamble is detected.

In implementations, the relay device, which acts as a standard node, first accesses the LoRa network according to a standard process of network access. Specifically, the relay device first sends a network access request frame with a second preamble to the base station, and then receives a network access response frame returned by the base station. After the standard network access is successful, the relay device enters into an intermittent sleep state to save power consumption.

In implementations, the relay device periodically wakes up from the intermittent sleep state, and detects whether a first preamble is present when the relay device wakes up. If the first preamble is detected, the relay device activates a data receiving function and receives a radio frame after the first preamble.

In implementations, a wake-up period of the relay device is shorter than a length of the first preamble, so that the first preamble does not miss detection when the relay device wakes up.

For example, the wake-up period of the relay device is 4 seconds. In other words, the relay device wakes up every 4 seconds. In this case, the length of the first preamble is longer than or equal to 4 seconds.

S404: The relay device replaces the first preamble with a second preamble, and sends the network access request frame with the second preamble to a base station, a length of the second preamble being shorter than a length of the first preamble.

The relay device replaces the first preamble with a second preamble, and forwards the network access request frame with the second preamble to the base station.

S406: The relay device receives a network access response frame returned by the base station, and sends the network access response frame to the terminal.

After receiving the network access request frame forwarded by the relay device, the base station returns a network access response frame to the relay device. The network access response frame also carries a second preamble, and the relay device receives the network access response frame according to the preamble. Finally, the relay device returns the network access response frame with the second preamble to the terminal, and the network access of the terminal is successful.

In implementations, the relay device sending the network access response frame to the terminal may include:

the relay device sending the network access response frame to the terminal within a second receive window after the network access request frame with the first preamble is sent by the terminal; and the relay device entering into the intermittent sleep state after sending the network access response frame.

In implementations, the relay device is set to make downlink transmission to the terminal within a second receive window after the terminal makes upstream transmission. Therefore, the relay device sends a network access response frame to the terminal within a second receive window after the terminal sends a network access request frame with a first preamble. After sending the network access response frame, the relay device enters into an intermittent sleep state and waits for a next wake-up.

In implementations, the method 400 may further include: the relay device receiving an uplink data frame with a first preamble sent by the terminal.

After connecting to the network through the relay device, the terminal sends an uplink data frame with a first preamble to the relay device.

In implementations, the relay device receiving the uplink data frame with the first preamble sent by the terminal may include:

the relay device periodically waking up from the intermittent sleep state, and detecting whether a first preamble is present when waking up; and the relay device receiving an uplink data frame after the first preamble if the first preamble is detected.

In implementations, the method 400 may further include: the relay device replacing the first preamble with a second preamble, and sends the uplink data frame with the second preamble to the base station.

The relay device uses the second preamble to replace the first preamble, and forwards the uplink data frame with the second preamble to the base station.

In implementations, the method may further include: the relay device receiving a downlink data frame returned by the base station, and sending the downlink data frame to the terminal.

In implementations, the relay device sending the downlink data frame to the terminal may include:

the relay device sending the downlink data frame to the terminal within a second receive window after the uplink data frame with the first preamble is sent by the terminal; and the relay device entering into the intermittent sleep state after sending the downlink data frame.

In implementations, the relay device is set to make downlink transmission to the terminal within a second receive window after the terminal makes upstream transmission. Therefore, the relay device sends a network access response frame to the terminal within a second receive window after the terminal sends a network access request frame with a first preamble. After sending the network access response frame, the relay device enters into an intermittent sleep state and waits for a next wake-up.

In implementations, the terminal may send a network access request frame with a first preamble to the relay device, and the relay device forwards the network access request frame to the base station. The relay device then sends a network access response frame returned by the base station to the terminal, thus completing a process of network access of the terminal.

After the terminal connects to the network through the relay device, the terminal can send an uplink data frame with a first preamble to the relay device, and the relay device forwards the uplink data frame to the base station. The relay device then sends a downlink data frame returned by the base station to the terminal to complete a process of communication between the terminal and the base station.

In implementations, a terminal may access a network through a relay device and communicate with a base station. In implementations, a LoRaWAN radio frame format of the terminal is not changed, and only a length of a preamble is increased. Such relay device does not use a private frame structure, and is highly compatible with the LoRaWAN standard, providing a guarantee of a unified LoRa relay standard for various manufacturers.

A process of network access of a terminal is described below from the perspective of a relay device.

Figure 5:
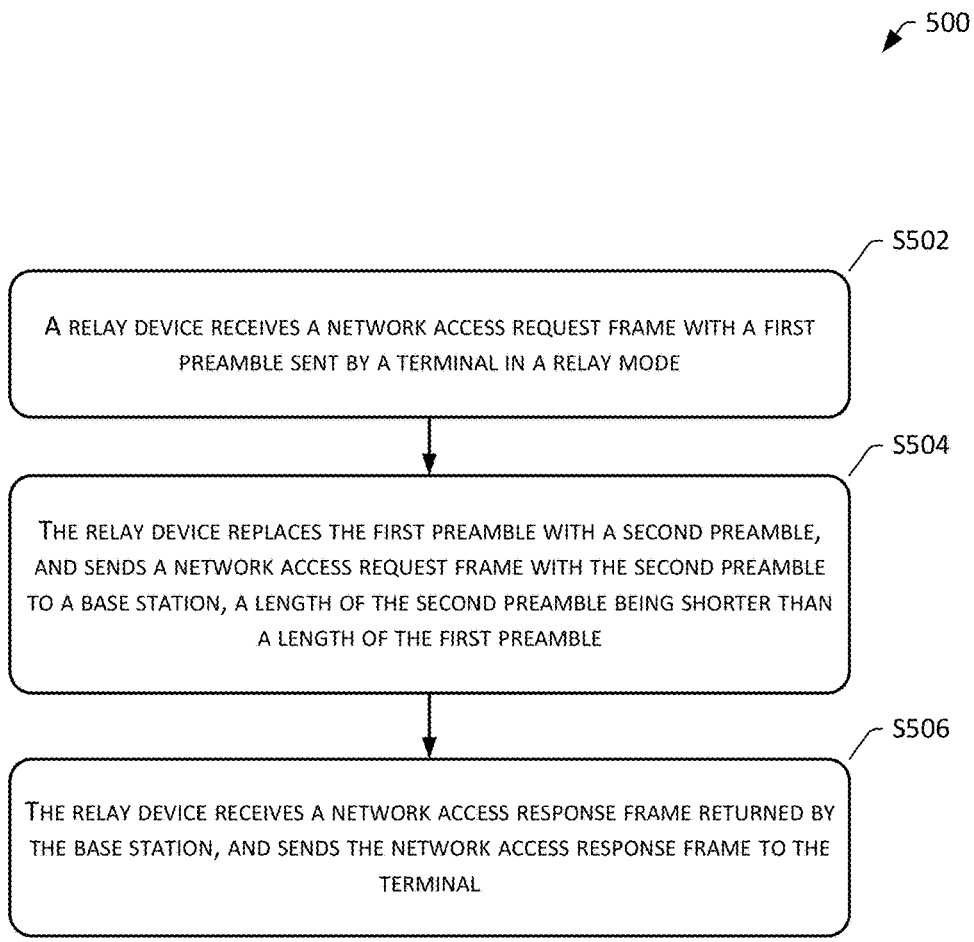
FIG. 5 is a flowchart of a network access method for a terminal according to the embodiments of the present disclosure.

Referring to FIG. 5, a flowchart of a network access method 500 for a terminal according to the embodiments of the present disclosure is shown. In implementations, the method 500 may include the following steps:

S502: A relay device receives a network access request frame with a first preamble sent by a terminal in a relay mode.

In implementations, the terminal has two working modes which are a normal mode and a relay mode. The terminal can initiate a process of network access in the normal mode or the relay mode.

If the terminal initiates a process of network access in the relay mode, the terminal may first send a network access request frame with a first preamble to the relay device. A sending method may be a broadcasting or unicasting method.

In implementations, S502 may include:

the relay device periodically waking up from an intermittent sleep state, and detecting whether a first preamble is present when waking up; and the relay device receiving a network access request frame after the first preamble if the first preamble is detected.

In implementations, a wake-up period of the relay device is shorter than a length of the first preamble, so that the first preamble does not miss detection when the relay device wakes up.

In implementations, the relay device periodically wakes up from an intermittent sleep state, and detects whether a first preamble is present when the relay device wakes up. If the first preamble is detected, the relay device activates a data receiving function and receives a radio frame after the first preamble.

In implementations, the relay device may have a CAD mode.

The channel activity detection mode is designed to detect a LoRa preamble on a wireless channel with the highest possible power consumption efficiency. In the CAD mode, the relay device quickly scans a frequency band to detect a preamble of a LoRa radio frame.

S504: The relay device replaces the first preamble with a second preamble, and sends a network access request frame with the second preamble to a base station, a length of the second preamble being shorter than a length of the first preamble.

S506: The relay device receives a network access response frame returned by the base station, and sends the network access response frame to the terminal.

In implementations, the relay device sending the network access response frame to the terminal includes:

the relay device sending the network access response frame to the terminal within a second receive window after the network access request frame with a first preamble is sent by the terminal; and the relay device entering into the intermittent sleep state after sending the network access response frame.

In implementations, the terminal may send a network access request frame with a first preamble to the relay device, and the relay device forwards the network access request frame to the base station. The relay device then sends a network access response frame returned by the base station to the terminal to complete a process of network access of the terminal.

A process of communication after a terminal connects to a network is described below from the perspective of a relay device.

Figure 6:
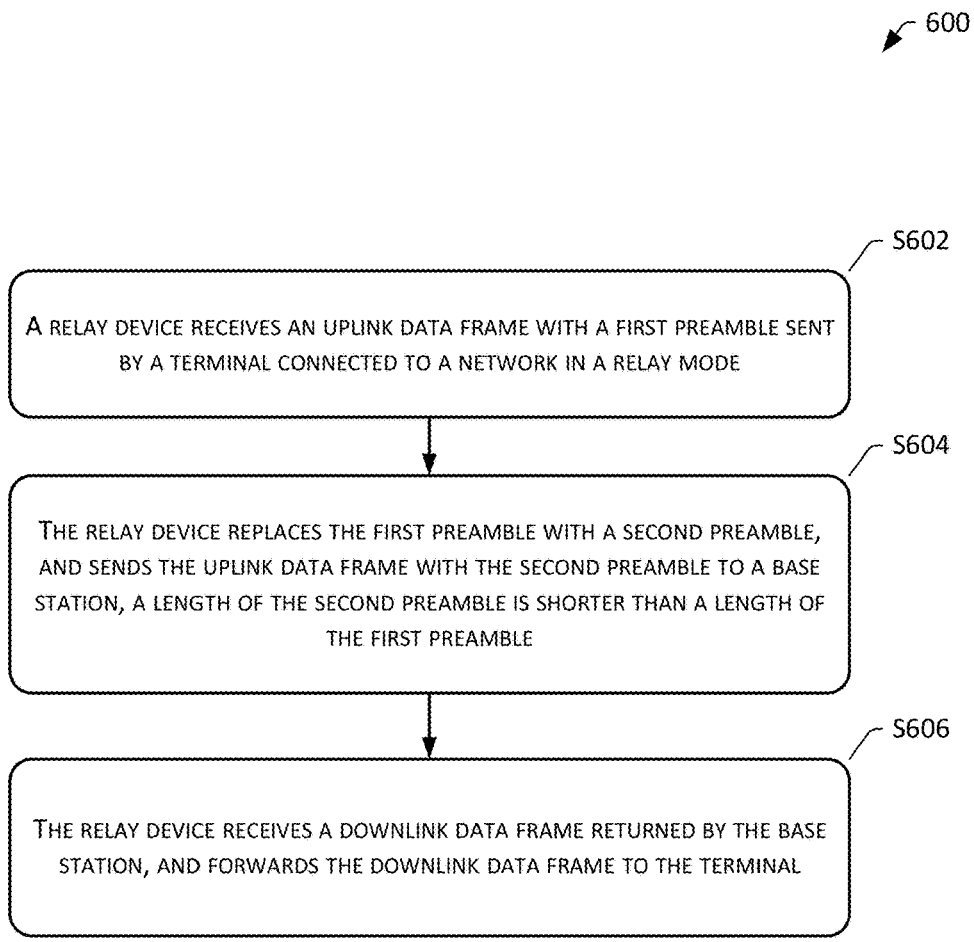
FIG. 6 is a flowchart of a communication method for a terminal and a base station according to the embodiments of the present disclosure.

Referring to FIG. 6, a flowchart of a communication method 600 for a terminal and a base station according to the embodiments of the present disclosure is shown. In implementations, the method 600 may include the following steps:

S602: A relay device receives an uplink data frame with a first preamble sent by a terminal connected to a network in a relay mode.

In implementations, the terminal has two working modes which are a normal mode and a relay mode. The terminal can initiate a process of network access in the normal mode or the relay mode.

If the terminal is already connected to the network in the relay mode, a data uplink method of the terminal is to add a first preamble before an uplink data frame, and then send the uplink data frame with the first preamble to the relay device.

In implementations, S602 may include:

the relay device periodically waking up from an intermittent sleep state, and detecting whether a first preamble is present when waking up; and the relay device receiving an uplink data frame after the first preamble if the first preamble is detected.

In implementations, a wake-up period of the relay device is shorter than a length of the first preamble.

In implementations, the relay device may have a CAD mode.

The channel activity detection mode is designed to detect a LoRa preamble on a wireless channel with the highest possible power consumption efficiency. In the CAD mode, the relay device quickly scans a frequency band to detect a preamble of a LoRa radio frame.

In implementations, the relay device periodically wakes up from an intermittent sleep state, and detects whether a first preamble is present when the relay device wakes up. If a first preamble is detected, the relay device activates a data receiving function and receives a radio frame after the first preamble.

S604: The relay device replaces the first preamble with a second preamble, and sends the uplink data frame with the second preamble to a base station, a length of the second preamble is shorter than a length of the first preamble.

After receiving the uplink data frame, the relay device replaces the first preamble with a second preamble, and forwards the uplink data frame with the second preamble to the base station.

S606: The relay device receives a downlink data frame returned by the base station, and forwards the downlink data frame to the terminal.

In implementations, S606 may include:

the relay device sending the downlink data frame to the terminal within a second receive window after the uplink data frame with the first preamble is sent by the terminal.

the relay device entering into the intermittent sleep state after sending the downlink data frame.

In implementations, the relay device is set to make downlink transmission to the terminal within a second receive window after the terminal makes upstream transmission. Therefore, the relay device sends a downlink data frame to the terminal within the second receive window after the terminal sends an uplink data frame with a first preamble. After sending the downlink data frame, the relay device enters into an intermittent sleep state and waits for a next wake-up. In implementations, after the terminal connects to the network through the relay device, the terminal may send an uplink data frame with a first preamble to the relay device, and the relay device forwards the uplink data frame to the base station. The relay device then sends a downlink data frame returned by the base station to the terminal, thereby completing a process of communication between the terminal and the base station.

In order to enable those skilled in the art to better understand the embodiments of the present disclosure, the embodiments of the present disclosure are described below using an example.

Figure 7:
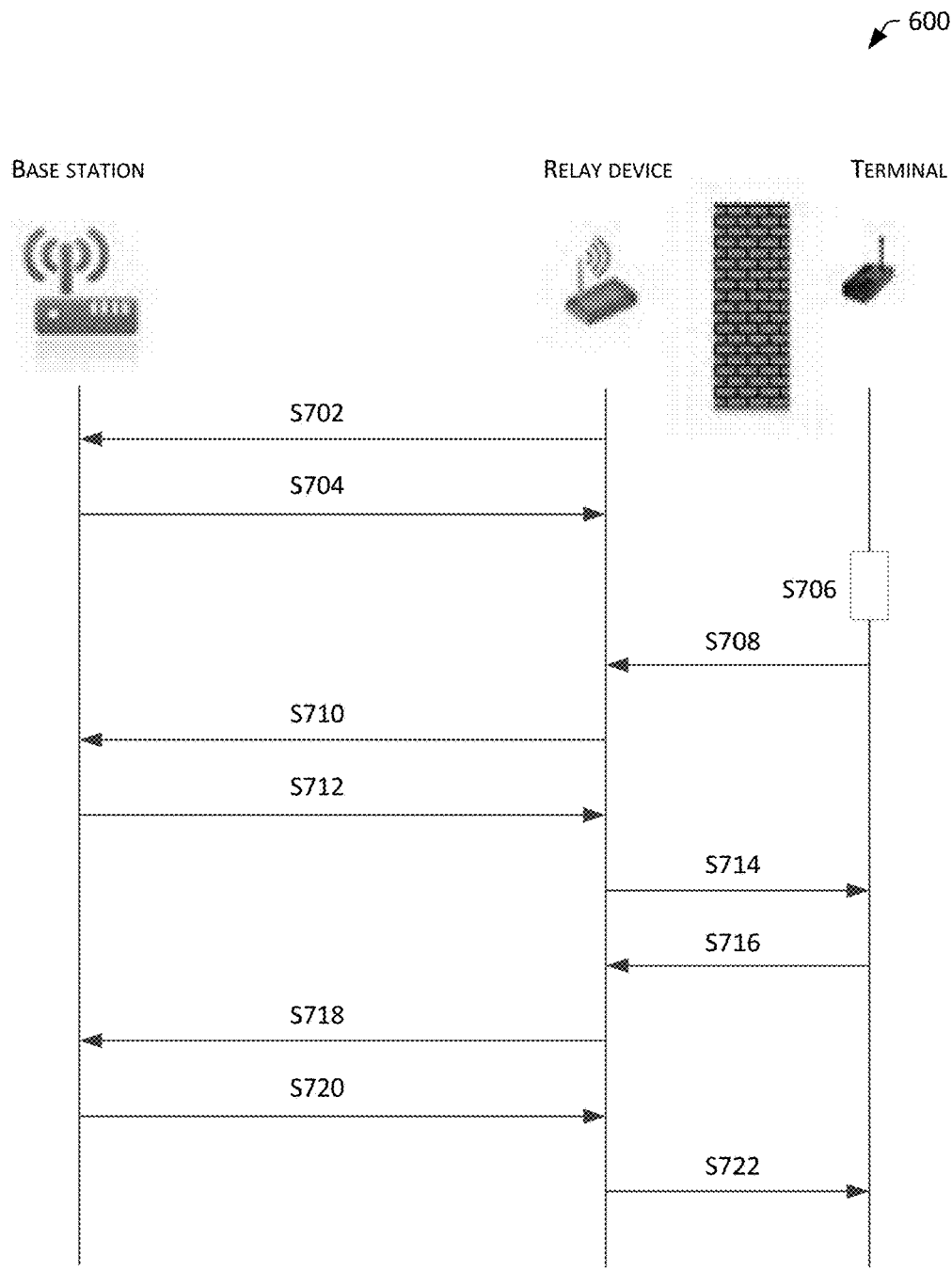
FIG. 7 is a flowchart of communication between a terminal and a base station according to the embodiments of the present disclosure.

FIG. 7 is a flowchart of communications 700 between a terminal and a base station according to the embodiments of the present disclosure.

S702: As a standard node, a LoRa relay device sends a network access request frame to a LoRa base station.

S704: As a standard node, the LoRa relay device receives a network confirmation frame returned by the LoRa base station, and then enters into an intermittent sleep state.

S706: A LoRa terminal sends a network access request frame with a second preamble in a normal mode, and fails to receive a network access response frame. A standard process of network access fails.

S708: The LoRa terminal switches to a relay mode, and sends a network access request frame with a first preamble in a relay mode.

S710: Being activated by the first preamble, the LoRa relay device receives the network access request frame, replaces the first preamble with a second preamble, and then forwards the network access request frame with the first preamble to the LoRa base station.

S712: The LoRa relay device receives a network access response frame returned by the LoRa base station.

S714: The LoRa relay device forwards a network confirmation frame to the LoRa terminal in the relay mode within a RX2 window, and then enters into the intermittent sleep state.

S716: The LoRa terminal sends an uplink data frame with a first preamble in the relay mode.

S718: Being activated by the first preamble, the LoRa relay device receives the uplink data frame, replaces the first preamble with a second preamble, and then forwards the uplink data frame with the first preamble to the LoRa base station.

S720: The LoRa relay device receives a downlink data frame returned by the LoRa base station.

S722: The LoRa relay device forwards the downlink data frame to the LoRa terminal in the relay mode within a RX2 window, and then enters into the intermittent sleep state, waiting for a next activation.

It should be noted that the method embodiments are all described as series of action combinations for the ease of description. However, those skilled in the art should know that the embodiments of the present disclosure are not limited by the described orders of actions because some steps may be performed in other orders or in parallel according to the embodiments of the present disclosure. Furthermore, those skilled in the art should also know that the embodiments described in the specification are all exemplary embodiments, and actions involved therein may not necessarily needed by the embodiments of the present disclosure.

Figure 8:
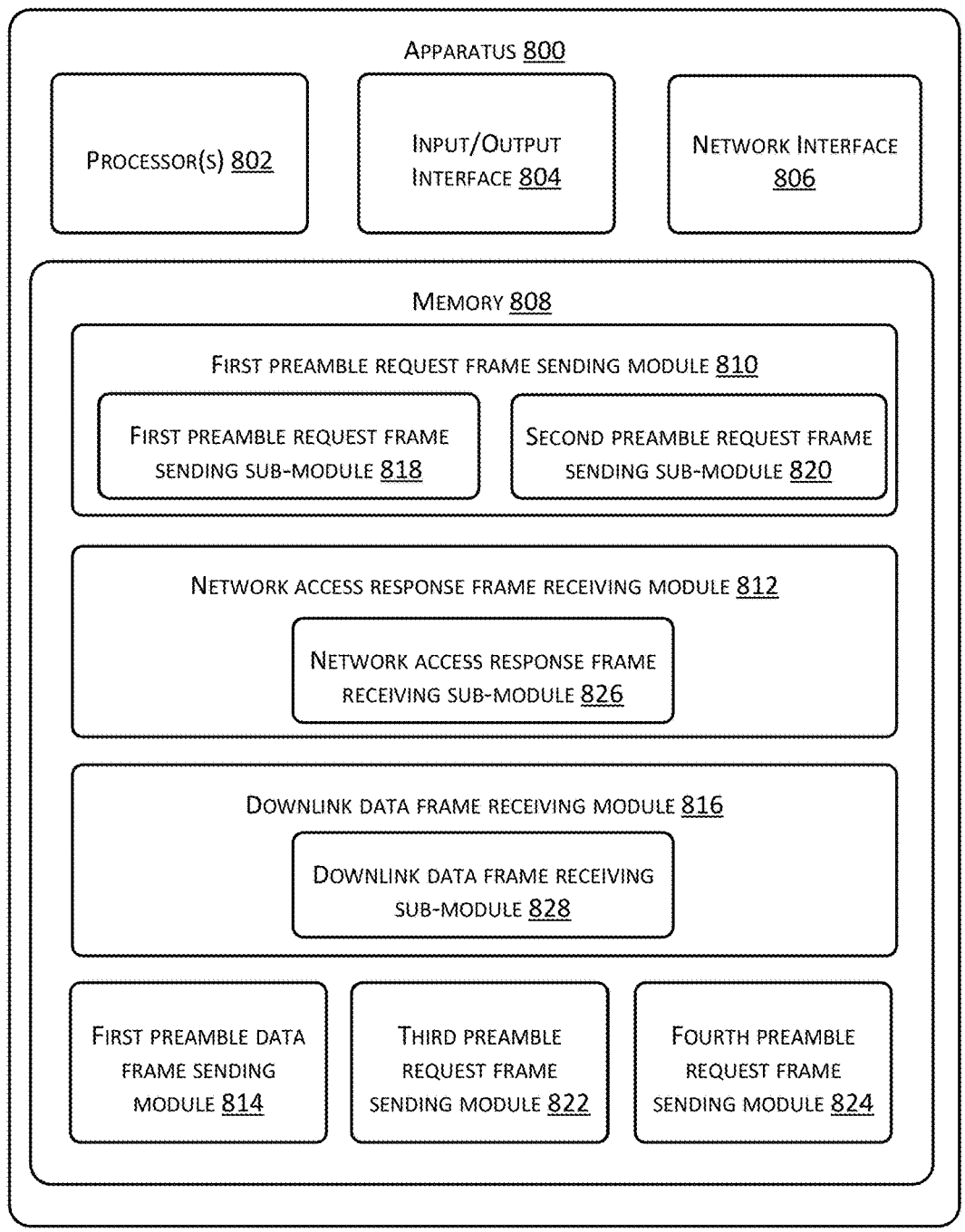
FIG. 8 is a structural block diagram of a communication apparatus for a terminal and a base station according to the embodiments of the present disclosure.

Referring to FIG. 8, a structural block diagram of a communication apparatus 800 for a terminal and a base station according to the embodiments of the present disclosure is shown. In implementations, the apparatus 800 may include the terminal, or may be included in and/or implemented by the terminal. In implementations, the apparatus

800 may include one or more processors 802, an input/output (I/O) interface 804, a network interface 806, and a memory 808.

The memory 808 may include a form of computer-readable media such as a volatile memory, a random access memory (RAM) and/or a non-volatile memory, for example, a read-only memory (ROM) or a flash RAM. The memory 808 is an example of a computer-readable media.

The computer-readable media may include a volatile or non-volatile type, a removable or non-removable media, which may achieve storage of information using any method or technology. The information may include a computer-readable instruction, a data structure, a program module or other data. Examples of computer-readable media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer-readable media does not include transitory media, such as modulated data signals and carrier waves.

In implementations, the apparatus 800 may include the following modules:

a first preamble request frame sending module 810 located at the terminal, configured to send a network access request frame with a first preamble to a relay device, the relay device being configured to receive the network access request frame according to the first preamble, send the network access request frame with a second preamble to the base station, and receive a network access response frame returned by the base station, a length of the second preamble being shorter than a length of the first preamble; and a network access response frame receiving module 812 located at the terminal, configured to receive the network access response frame sent by the relay device.

In implementations, the apparatus 800 may further include:

a first preamble data frame sending module 814 located at the terminal, configured to send an uplink data frame with the first preamble to the relay device, the relay device being further configured to receive the uplink data frame according to the first preamble, send the uplink data frame with the second preamble to the base station, and receive a downlink data frame returned by the base station; and a downlink data frame receiving module 816 located at the terminal, configured to receive the downlink data frame sent by the relay device.

In implementations, the first preamble request frame sending module 810 may include:

a first preamble request frame sending sub-module 818, configured to cause the terminal to send the network access request frame with the first preamble to the relay device, if the terminal does not receive the network access response frame within a first receive window and a second receive window after the network access request frame with the second preamble is sent; or a second preamble request frame sending sub-module 820, configured to cause the terminal to send the network access request frame with the first preamble to the relay device, if the terminal receives the network access response frame within the second receive window after the network access request frame with the second preamble is sent.

In implementations, the apparatus 800 may further include:

a third preamble request frame sending module 822 located at the terminal, configured to send the network access request frame with the second preamble to the base station, if the terminal receives the network access request frame within a first receive window after the network access request frame with the first preamble is sent.

In implementations, the apparatus 800 may further include:

a fourth preamble request frame sending module 824 located at the terminal, configured to send the network access request frame with the second preamble to the base station, if the terminal does not receive network access response frame within a first receive window and a second receive window after the network access request frame with the first preamble is sent.

In implementations, the network access response frame receiving module 812 may include:

a network access response frame receiving sub-module 826 configured to receive the network access response frame sent by the relay device within a second receive window after the network access request frame with the first preamble is sent.

In implementations, the downlink data frame receiving module 816 may include:

a downlink data frame receiving sub-module 828 configured to receive the downlink data frame sent by the relay device within a second receive window after the uplink data frame with the first preamble is sent.

Figure 9:
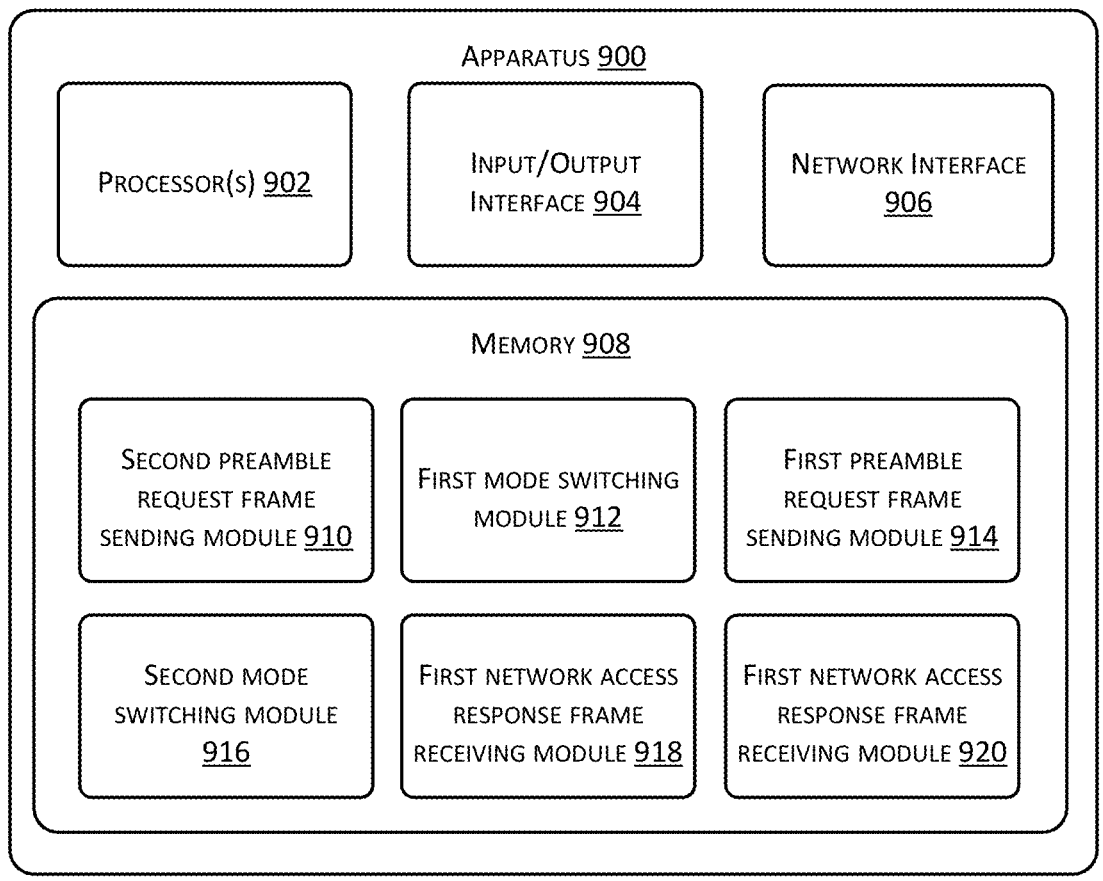
FIG. 9 is a structural block diagram of a network access apparatus for a terminal according to the embodiments of the present disclosure.

Referring to FIG. 9, a structural block diagram a network access apparatus 900 for a terminal according to the embodiments of the present disclosure is shown. In implementations, the apparatus 900 may include the terminal, or may be included in and/or implemented by the terminal. In implementations, the apparatus 900 may include one or more processors 902, an input/output (I/O) interface 904, a network interface 906, and a memory 908. The memory 908 may include a form of computer-readable media. The memory 908 is an example of a computer-readable media.

In implementations, the apparatus 900 may include the following modules:

a second preamble request frame sending module 910 located at the terminal, configured to send a network access request frame with a second preamble in a normal mode;

a first mode switching module 912 located at the terminal, configured to switch from the normal mode to a relay mode if the terminal receives a network access response frame within a second receive window after the network access request frame with the second preamble is sent;

a first preamble request frame sending module 914 located at the terminal, configured to send the network access request frame with a first preamble in a relay mode, a length of the second preamble being shorter than a length of the first preamble; and a second mode switching module 916 located at the terminal, configured to switch from the relay mode to the normal mode, if the terminal receives the network access response frame within a first receive window after the network access request frame with the first preamble is sent, or if the terminal does not receive the network access response frame within the first receive window and the second receive window after the network access request frame with the first preamble is sent.

In implementations, the apparatus 900 may further include:

a first network access response frame receiving module 918 located at the terminal, configured to receive the network access response frame within the first receive window after sending the network access request frame with the second preamble, and connect to a network in the normal mode.

In implementations, the apparatus 900 may further include:

a first network access response frame receiving module 920 located at the terminal, configured to receive the network access response frame within the second receive window after sending the network access request frame with the first preamble, and connect to a network in the relay mode.

Figure 10:
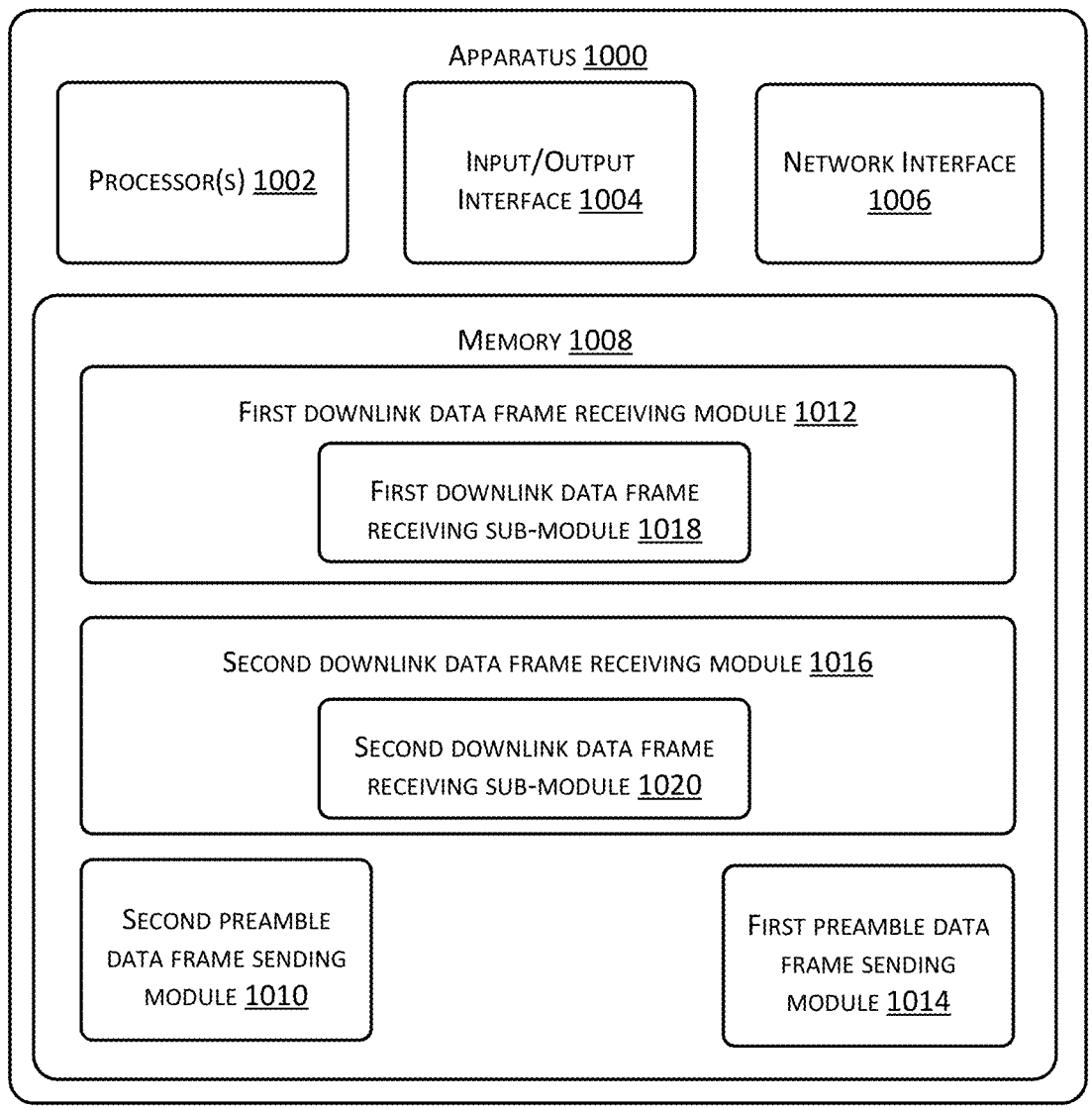
FIG. 10 is a structural block diagram of a communication apparatus for a terminal and a base station according to the embodiments of the present disclosure.

Referring to FIG. 10, a structural block diagram of a communication apparatus 1000 for a terminal and a base station according to the embodiments of the present disclosure is shown. In implementations, the apparatus 1000 may include the terminal, or may be included in and/or implemented by the terminal. In implementations, the apparatus 1000 may include one or more processors 1002, an input/output (I/O) interface 1004, a network interface 1006, and a memory 1008. The memory 1008 may include a form of computer-readable media. The memory 1008 is an example of a computer-readable media.

In implementations, the apparatus 1000 may include the following modules:

a second preamble data frame sending module 1010 located at the terminal, configured to send an uplink data frame with the second preamble to the base station in the normal mode if the terminal accesses the network in the normal mode;

a first downlink data frame receiving module 1012 located at the terminal, configured to receive a downlink data frame returned by the base station;

a first preamble data frame sending module 1014 located at the terminal, configured to send the uplink data frame with the first preamble to a relay device in the relay mode if the terminal accesses the network in the relay mode, the relay device being configured to replace the first preamble with the second preamble, and forward the uplink data frame with the second preamble to the base station, a length of the second preamble being shorter than a length of the first preamble; and a second downlink data frame receiving module 1016 located at the terminal, configured to receive the downlink data frame forwarded by the relay device and returned by the base station.

In implementations, the first downlink data frame receiving module 1012 may include:

a first downlink data frame receiving sub-module 1018, configured to receive the downlink data frame returned by the base station within the first receive window after the uplink data frame with the second preamble is sent.

In implementations, the second downlink data frame receiving module 1016 may include:

a second downlink data frame receiving sub-module 1020, configured to receive the downlink data frame returned by the relay device and returned by the base station within the second receive window after the uplink data frame with the first preamble is sent.

Figure 11:
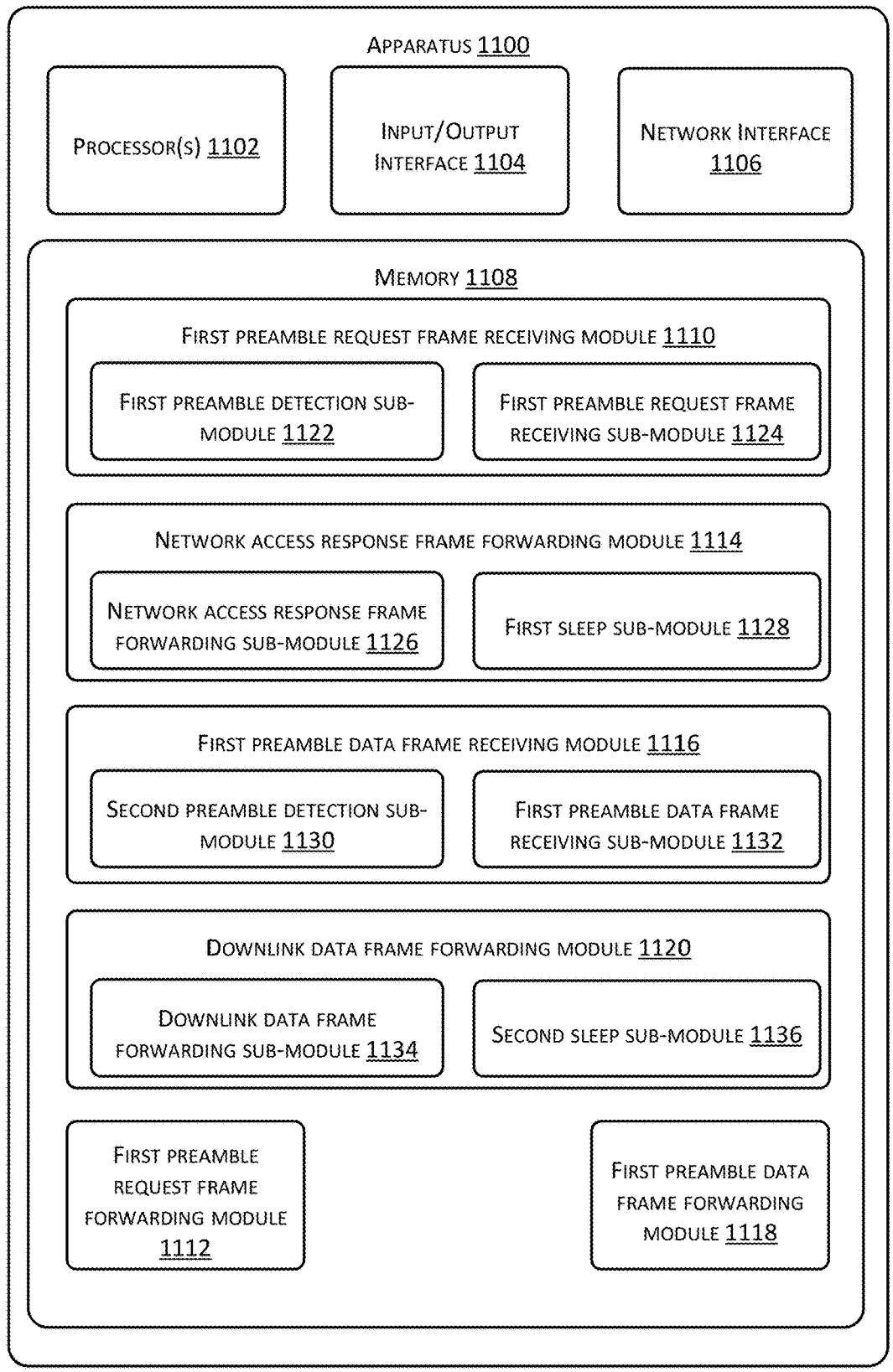
FIG. 11 is a structural block diagram of a communication apparatus for a terminal and a base station according to the embodiments of the present disclosure.

Referring to FIG. 11, a structural block diagram of a communication apparatus 1100 for a terminal and a base station according to the embodiments of the present disclosure is shown. In implementations, the apparatus 1100 may include a relay device, or may be included in and/or implemented by the relay device. In implementations, the apparatus 1100 may include one or more processors 1102, an input/output (I/O) interface 1104, a network interface 1106, and a memory 1108. The memory 1108 may include a form of computer-readable media. The memory 1108 is an example of a computer-readable media.

In implementations, the apparatus 1100 may include the following modules:

a first preamble request frame receiving module 1110 located at a relay device, configured to receive a network access request frame with a first preamble sent by the terminal;

a first preamble request frame forwarding module 1112 located at the relay device, configured to replace the first preamble with a second preamble, and send the network access request frame with the second preamble to the base station, a length of the second preamble being shorter than a length of the first preamble; and a network access response frame forwarding module 1114 located at the relay device, configured to receive a network access response frame returned by the base station, and send the network access response frame to the terminal.

In implementations, the apparatus 1100 may further include:

a first preamble data frame receiving module 1116 located at the relay device, configured to receive an uplink data frame with the first preamble sent by the terminal;

a first preamble data frame forwarding module 1118 located at the relay device, configured to replace the first preamble with the second preamble, and send an uplink data frame with the second preamble to the base station; and a downlink data frame forwarding module 1120 located at the relay device, configured to receive a downlink data frame returned by the base station and send the downlink data frame to the terminal.

In implementations, the first preamble request frame receiving module 1110 may include:

a first preamble detection sub-module 1122, configured to periodically wake up from an intermittent sleep state, and detect whether the first preamble is present when waking up; and a first preamble request frame receiving sub-module 1124, configured to receive the network access request frame after the first preamble if the first preamble is detected.

In implementations, the network access response frame forwarding module 1114 may include:

a network access response frame forwarding sub-module 1126, configured to send the network access response frame to the terminal within a second receive window after the network access request frame with the first preamble is sent by the terminal; and a first sleep sub-module 1128, configured to enter into the intermittent sleep state after sending the network access response frame.

In implementations, the first preamble data frame receiving module 1116 may include:

a second preamble detection sub-module 1130, configured to periodically wake up from an intermittent sleep state, and detect whether the first preamble is present when waking up; and a first preamble data frame receiving sub-module 1132, configured to receive the uplink data frame after the first preamble if the first preamble is detected.

In implementations, the downlink data frame forwarding module 1120 may include:

a downlink data frame forwarding sub-module 1134, configured to send the downlink data frame to the terminal within a second receive window after the uplink data frame with the first preamble is sent by the terminal; and a second sleep sub-module 1136, configured to enter into the intermittent sleep state after the downlink data frame is sent.

In implementations, a wake-up period of the relay device is shorter than the length of the first preamble.

Figure 12:
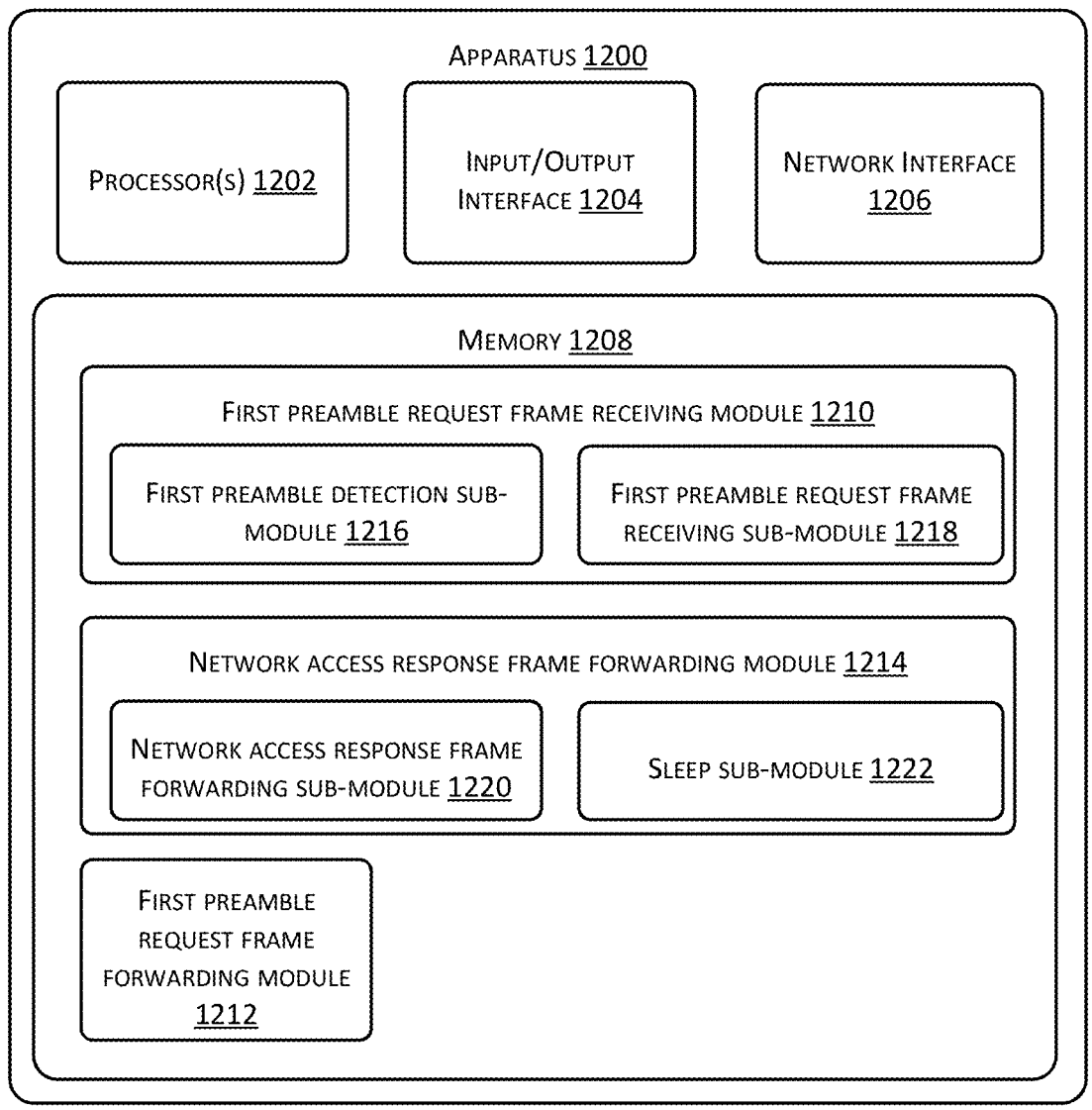
FIG. 12 is a structural block diagram of a network access apparatus for a terminal according to the embodiments of the present disclosure.

Referring to FIG. 12, a structural block diagram of a network access apparatus 1200 for a terminal according to the embodiments of the present disclosure is shown. In implementations, the apparatus 1200 may include a relay device, or may be included in and/or implemented by the relay device. In implementations, the apparatus 1200 may include one or more processors 1202, an input/output (I/O) interface 1204, a network interface 1206, and a memory 1208. The memory 1208 may include a form of computer-readable media. The memory 1208 is an example of a computer-readable media.

In implementations, the apparatus 1200 may include the following modules:

a first preamble request frame receiving module 1210 located at a relay device, configured to receive a network access request frame with a first preamble sent by the terminal in a relay mode;

a first preamble request frame forwarding module 1212 located at the relay device, configured to replace the first preamble with a second preamble, and send the network access request frame with the second preamble to a base station, a length of the second preamble being shorter than a length of the first preamble; and a network access response frame forwarding module 1214 located at the relay device, configured to receive a network access response frame returned by the base station, and send the network access response frame to the terminal.

In implementations, the first preamble request frame receiving module 1210 may include:

a first preamble detection sub-module 1216, configured to periodically wake up from an intermittent sleep state, and detect whether the first preamble is present when waking up; and a first preamble request frame receiving sub-module 1218, configured to cause the relay device to receive the network access request frame after the first preamble if the first preamble is detected.

In implementations, the network access response frame forwarding module 1214 may include:

a network access response frame forwarding sub-module 1220, configured to send the network access response frame to the terminal within the second receive window after the network access request frame with the first preamble is sent by the terminal; and a sleep sub-module 1222, configured to enter into the intermittent sleep state after the network access response frame is sent.

In implementations, a wake-up period of the relay device is shorter than a length of the first preamble.

Figure 13:
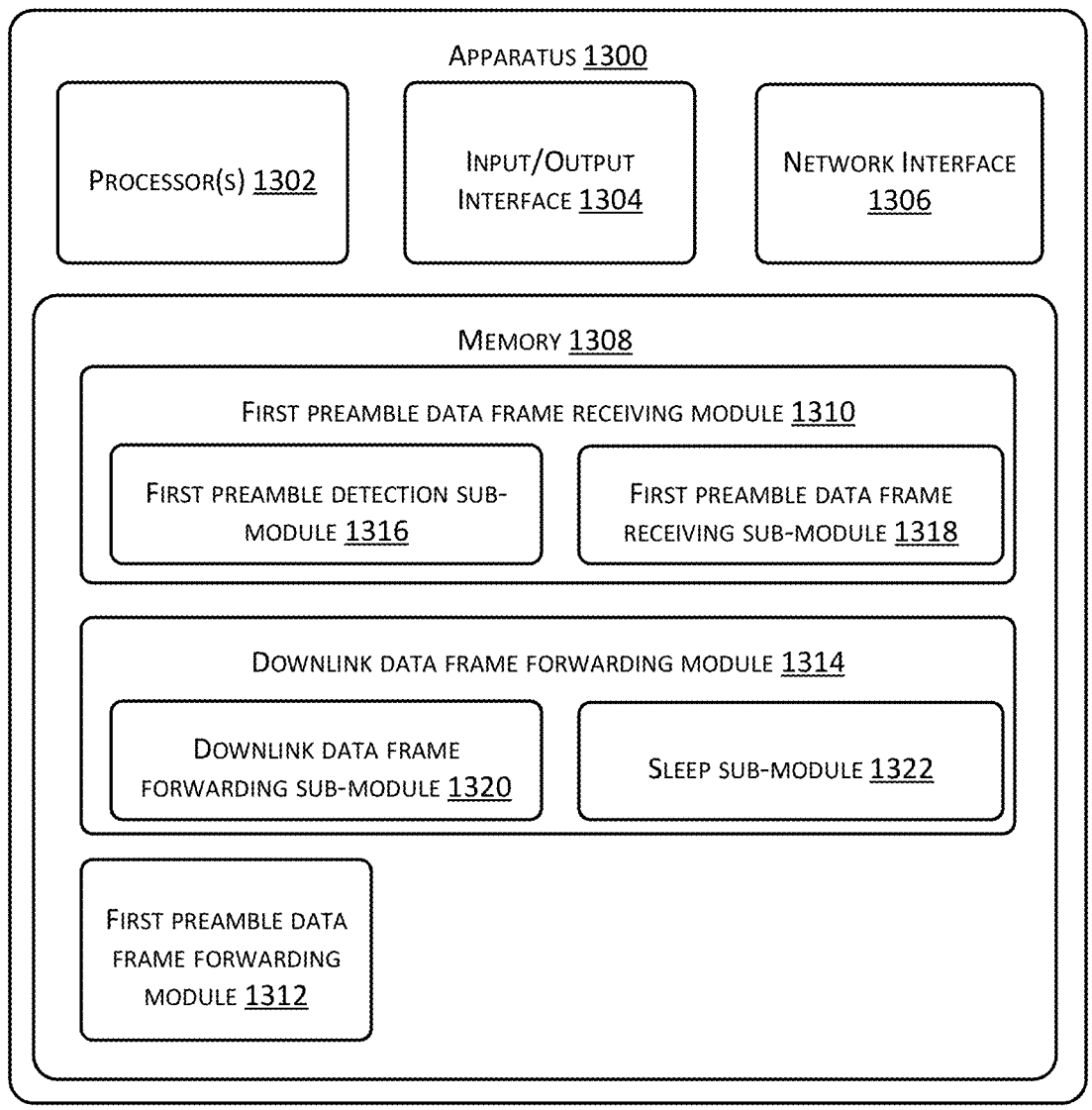
FIG. 13 is a structural block diagram of a communication apparatus for a terminal and a base station according to the embodiments of the present disclosure.

Referring to FIG. 13, a structural block diagram of a communication apparatus 1300 for a terminal and a base station according to the embodiments of the present disclosure is shown. In implementations, the apparatus 1300 may include a relay device, or may be included in and/or implemented by the relay device. In implementations, the apparatus 1300 may include one or more processors 1302, an input/output (I/O) interface 1304, a network interface 1306, and a memory 1308. The memory 1308 may include a form of computer-readable media. The memory 1308 is an example of a computer-readable media.

In implementations, the apparatus 1300 may include the following modules:

a first preamble data frame receiving module 1310 located at a relay device, configured to receive an uplink data frame with a first preamble sent by a terminal that connects to a network in a relay mode;

a first preamble data frame forwarding module 1312 located at the relay device, configured to replace the first preamble with a second preamble, and send the uplink data frame with the second preamble to the base station, a length of the second preamble being shorter than a length of the first preamble; and a downlink data frame forwarding module 1314 located at the relay device, configured to receive a downlink data frame returned by the base station, and forward the downlink data frame to the terminal.

In implementations, the first preamble data frame receiving module 1310 may include:

a first preamble detection sub-module 1316, configured to periodically wake up from an intermittent sleep state, and detect whether the first preamble is present when waking up;

a first preamble data frame receiving sub-module 1318, configured to cause the relay device to receive the uplink data frame after the first preamble if the first preamble is detected.

In implementations, the downlink data frame forwarding module 1314 may include:

a downlink data frame forwarding sub-module 1320, configured to send the downlink data frame to the terminal within a second receive window after the uplink data frame with the first preamble is sent by the terminal; and a sleep sub-module 1322, configured to enter into the intermittent sleep state after the downlink data frame is sent.

In implementations, a wake-up period of the relay device is shorter than a length of the first preamble.

Due to their substantial similarities to the method embodiments, the description of the apparatus embodiments is relatively simple. Therefore, for related parts, reference can be made to the description of the method embodiments.

The embodiments of the present disclosure further provide an apparatus, which includes:

one or more processors; and one or more machine-readable media having instructions stored thereon that, when executed by the one or more processors, cause the apparatus to execute the method(s) described in implementations.

The embodiments of the present disclosure further provide one or more machine-readable media storing instructions thereon that, when executed by one or more processors, cause an apparatus to execute the method(s) described in implementations.

Various embodiments in the present specification are described in a progressive manner. Each embodiment focuses on aspects that are different from those of other embodiments. Same or similar parts among various embodiments may be referred to each other.

Those skilled in the art should understand that example implementations of the embodiments of the present disclosure may be provided as a method, an apparatus, or a computer program product. Therefore, the embodiments of the present disclosure may take a form of an entirely hardware embodiment, an entirely software embodiment, or an embodiment of a combination of software and hardware aspects. Moreover, the embodiments of the present disclosure may take a form of a computer program product implemented on one or more computer-usable storage media (including, but not limited to, a magnetic storage device, a CD-ROM, an optical storage device, etc.) including computer-usable program codes.

The embodiments of the present disclosure are described with reference to and according to flowcharts and/or block diagrams of exemplary methods, terminal devices (systems), and computer program products of the present disclosure. It should be understood that computer program instructions are used to implement each process and/or block of the flowcharts and/or the block diagrams, and combinations of processes and/or blocks of the flowcharts and/or the block diagrams. These computer program instructions can be provided to a processor of a general-purpose computer, a special-purpose computer, an embedded processor or other programmable data processing terminal device to produce a machine, to cause the instructions that are executed by the processor of the computer or the other programmable data processing terminal device to produce an apparatus for implementing the functions specified in one or more processes in the flowcharts or one or more blocks of the block diagrams.

The computer program instructions can also be stored in a computer readable storage device that can direct a computer or other programmable data processing terminal device to operate in a particular manner, such that the instructions stored in the computer readable storage device produce an article of manufacture including an instruction apparatus. The instruction apparatus implements the functions specified in one or more processes of the flowcharts and/or one or more blocks of the block diagrams.

These computer program instructions can also be loaded onto a computer or other programmable data processing terminal device, such that a series of operational steps are executed by the computer or the other programmable terminal device to produce computer-implemented processing, thereby the instructions executed by the computer or the other programmable terminal device providing steps for implementing the functions specified in one or more processes of the flowcharts and/or one or more blocks of the block diagrams.

Although exemplary embodiments of the embodiments of the present disclosure have been described, one skilled in the art can make further changes and modifications to the embodiments once being aware of the basic inventive concepts. Therefore, the appended claims are intended to be interpreted as including all changes and modifications that fall within the scope of the exemplary embodiments and the embodiments of the present disclosure.

Finally, it should also be noted that relational terms such as first and second in this context are used merely to distinguish one entity or operation from another entity or operation, and do not necessarily require or imply any type of actual relationship or order between these entities or operations. Furthermore, terms "containing", "including", or any other variations are intended to encompass a non-exclusive inclusion, such that a process, method, article, or terminal device that includes a series of elements not only includes these elements, but also includes other elements that are explicitly listed, or includes elements that are inherent to such process, method, article, or terminal device. Without any additional limitations, an element defined by a phrase "including a . . . " does not exclude the presence of additional identical elements in the process, method, article, or terminal device that includes the element.

Communication methods for a terminal and a base station, communication apparatuses for a terminal and a base station, network access methods for a terminal, and network access apparatuses for a terminal provided by the present disclosure are described in detail above. The principles and implementations of the present disclosure are described using the specific examples. The above description of the embodiments is merely used for helping the understanding of the methods of the present disclosure and core ideas thereof. Furthermore, for one skilled in the art, changes exist in the specific implementations and application scopes according to the ideas of the present disclosure. In summary, the content of this specification should not be construed as limitations to the present disclosure.

The present disclosure can be further understood using the following clauses.

Clause 1: A communication method for a terminal and a base station, comprising: the terminal sending a network access request frame with a first preamble to a relay device, the relay device being configured to receive the network access request frame according to the first preamble, send the network access request frame with a second preamble to the base station, and receive a network access response frame returned by the base station, a length of the second preamble being smaller than a length of the first preamble; and the terminal receiving the network access response frame sent by the relay device.

Clause 2: The method of Clause 1, further comprising: the terminal sending an uplink data frame with the first preamble to the relay device, the relay device being further configured to receive the uplink data frame according to the first preamble, send the uplink data frame with the second preamble to the base station, and receive a downlink data frame returned by the base station; and the terminal receiving the downlink data frame sent by the relay device.

Clause 3: The method of Clause 1, wherein the terminal sending the network access request frame with the first preamble to the relay device comprises: the terminal sending the network access request frame with the first preamble to the relay device, if the terminal does not receive the network access response frame within a first receive window and a second receive window after the network access request frame with the second preamble is sent; or the terminal sending the network access request frame with the first preamble to the relay device, if the terminal receives the network access response frame within the second receive window after sending the network access request frame with the second preamble.

Clause 4: The method of Clause 1, further comprising: the terminal sending the network access request frame with the second preamble to the base station, if the terminal receives a network access request frame within a first receive window after the network access request frame with the first preamble is sent.

Clause 5: The method of Clause 4, further comprising: the terminal sending the network access request frame with the second preamble, If the terminal does not receive the network access response frame within a first receive window and a second receive window after the network access request frame with the first preamble is sent.

Clause 6: The method of Clause 1, wherein the terminal receiving the network access response frame sent by the relay device comprises: the terminal receiving the network access response frame that is sent by the relay device within a second receive window after the network access request frame with the first preamble is sent.

Clause 7: The method of Clause 2, wherein the terminal receiving the downlink data frame sent by the relay device comprises: the terminal receiving the downlink data frame sent by the relay device within a second receive window after the uplink data frame with the first preamble is sent.

Clause 8: A network access method for a terminal, comprising: the terminal sending a network access request frame with a second preamble in a normal mode; the terminal switching from the normal mode to a relay mode, if the terminal receives a network access response frame within a second receive window after the network access request frame with the second preamble is sent; the terminal sending the network access request frame with a first preamble in a relay mode; a length of the second preamble being smaller than a length of the first preamble; and the terminal switching from the relay mode to the normal mode, if the terminal receives a network access response frame within a first receive window after the network access request frame with the first preamble is sent, or if the terminal does not receive the network access response frame within the first receive window and the second receive window after the network access request frame with the first preamble is sent.

Clause 9: The method of Clause 8, further comprising: the terminal receiving the network access response frame within the first receive window after sending the network access request frame with the second preamble, and entering a network in the normal mode.

Clause 10: The method of Clause 8, further comprising: the terminal receiving the network access response frame within the second receive window after the network access request frame with the first preamble is sent, and connecting to a network in the relay mode.

Clause 11: A communication method for a terminal and a base station, comprising: the terminal sending an uplink data frame with a second preamble to the base station in a normal mode, if the terminal connects to a network in the normal mode; the terminal receiving a downlink data frame returned by the base station; the terminal sending the uplink data frame with a first preamble to the relay device in a relay mode, if the terminal accesses the network in the relay mode, the relay device being configured to use the second preamble to replace the first preamble, and forward the uplink data frame with the second preamble to the base station, a length of the second preamble being shorter than a length of the first preamble; and the terminal receiving a downlink data frame forwarded by the relay device and returned by the base station.

Clause 12: The method of Clause 11, wherein the terminal receiving the downlink data frame returned by the base station comprises: the terminal receiving the downlink data frame returned by the base station within a first receive window after the uplink data frame with the second preamble is sent.

Clause 13: The method of Clause 11, wherein the terminal receiving the downlink data frame forwarded by the relay device and returned by the base station comprises: the terminal receiving the downlink data frame forwarded by the relay device and returned by the base station within a second receive window after the uplink data frame with the first preamble is sent.

Clause 14: A communication method for a terminal and a base station, comprising: a relay device receiving a network access request frame with a first preamble sent by the terminal; the relay device replacing the first preamble with a second preamble, and sending the network access request frame with the second preamble to the base station, a length of the second preamble being shorter than a length of the first preamble; and the relay device receiving a network access response frame returned by the base station, and sending the network access response frame to the terminal.

Clause 15: The method of Clause 14, further comprising: the relay device receiving an uplink data frame with the first preamble sent by the terminal; the relay device replacing the first preamble with the second preamble, and sending an uplink data frame with the second preamble to the base station; and the relay device receiving a downlink data frame returned by the base station, and sending the downlink data frame to the terminal.

Clause 16: The method of Clause 14, wherein the relay device receiving the network access request frame with the first preamble sent by the terminal comprises: the relay device waking up periodically from an intermittent sleep state, and detecting whether the first preamble is present when waking up; and the relay device receiving the network access request frame after the first preamble is the first preamble is detected.

Clause 17: The method of Clause 16, wherein the relay device sending the network access response frame to the terminal comprises: the relay device sending the network access response frame to the terminal within a second receive window after the network access request frame with the first preamble is sent by the terminal; and the relay device entering into the intermittent sleep state after the network access response frame is sent.

Clause 18: The method of Clause 15, wherein the relay device receiving the uplink data frame with the first preamble sent by the terminal comprises: the relay device waking up periodically from an intermittent sleep state, and detecting whether the first preamble is present when waking up; and the relay device receiving the uplink data frame after the first preamble if the first preamble is detected.

Clause 19: The method of Clause 18, wherein the relay device sending the downlink data frame to the terminal comprises: the relay device sending the downlink data frame to the terminal within a second receive window after the uplink data frame with the first preamble is sent by the terminal; and the relay device entering into the intermittent sleep state after the downlink data frame is sent.

Clause 20: The method of Clause 16, wherein a wake-up period of the relay device is shorter than the length of the first preamble.

Clause 21: A network access method for a terminal, comprising: a relay device receiving a network access request frame with a first preamble sent by the terminal in a relay mode; the relay device replacing the first preamble with a second preamble, and sending the network access request frame with the second preamble to the base station, a length of the second preamble being shorter than a length of the first preamble; and the relay device receiving a network access response frame returned by the base station, and sending the network access response frame to the terminal.

Clause 22: The method of Clause 21, wherein the relay device receiving the network access request frame with the first preamble sent by the terminal in the relay mode comprises: the relay device waking up periodically from an intermittent sleep state, and detecting whether the first preamble is present when waking up; and the relay device receiving the network access request frame after the first preamble if the first preamble is detected.

Clause 23: The method of Clause 21, wherein the relay device sending the network access response frame to the terminal comprises: the relay device sending the network access response frame to the terminal within a second receive window after the network access request frame with the first preamble is sent by the terminal; and the relay device entering into the intermittent sleep state after the network access response frame is sent.

Clause 24: The method of Clause 22, wherein a wake-up period of the relay device is shorter than the length of the first preamble.

Clause 25: A communication method for a terminal and a base station, comprising: a relay device receiving an uplink data frame with a first preamble sent by the terminal that connects to a network in a relay mode; the relay device replacing the first preamble with a second preamble, and sending the uplink data frame with the second preamble to the base station, a length of the second preamble being shorter than a length of the first preamble; and the relay device receiving a downlink data frame returned by the base station, and forwarding the downlink data frame to the terminal.

Clause 26: The method of Clause 25, wherein the relay device receiving the uplink data frame with the first preamble sent by the terminal that connects to the network in the relay mode comprises: the relay device waking up periodically from an intermittent sleep state, and detecting whether the first preamble is present when waking up; and the relay device receiving the uplink data frame after the first preamble if the first preamble is detected.

Clause 27: The method of Clause 26, wherein the relay device forwarding the downlink data frame to the terminal comprises: the relay device sending the downlink data frame to the terminal within a second receive window after the uplink data frame with the first preamble is sent by the terminal; the relay device entering into the intermittent sleep state after the downlink data frame is sent.

Clause 28: The method of Clause 26, wherein a wake-up period of the relay device is shorter than the length of the first preamble.

Clause 29: A communication apparatus for a terminal and a base station, comprising: a first preamble request frame sending module located at the terminal, configured to send a network access request frame with a first preamble to a relay device, the relay device being configured to receive the network access request frame according to the first preamble, send the network access request frame with a second preamble to the base station, and receive a network access response frame returned by the base station, the length of the second preamble being shorter than the length of the first preamble; and a network access response frame receiving module located at the terminal, configured to receive the network access response frame sent by the relay device.

Clause 30: The apparatus of Clause 29, further comprising: a first preamble data frame sending module located at the terminal, configured to send an uplink data frame with the first preamble to the relay device, the relay device being further configured to receive the uplink data frame according to the first preamble, send the uplink data frame with the second preamble to the base station, and receive a downlink data frame returned by the base station; and a downlink data frame receiving module located at the terminal, configured to receive the downlink data frame sent by the relay device.

Clause 31: The apparatus of Clause 29, wherein the first preamble request frame sending module comprises: a first preamble request frame sending sub-module, configured to cause the terminal to send the network access request frame with the first preamble to the relay device, if the terminal does not receive the network access response frame within a first receive window and a second receive window after the network access request frame with the second preamble is sent; or a second preamble request frame sending sub-module, configured to cause the terminal to send the network access request frame with the first preamble to the relay device, if the terminal receives the network access response frame within the second receive window after the network access request frame with the second preamble is sent.

Clause 32: The apparatus of Clause 29, further comprising: a third preamble request frame sending module located at the terminal, configured to send the network access request frame with the second preamble to the base station, if the terminal receives the network access request frame within a first receive window after the network access request frame with the first preamble is sent.

Clause 33: The apparatus of Clause 32, further comprising: a fourth preamble request frame sending module located at the terminal, configured to send the network access request frame with the second preamble to the base station, if the terminal does not receive network access response frame within a first receive window and a second receive window after the network access request frame with the first preamble is sent.

Clause 34: The apparatus of Clause 29, wherein the network access response frame receiving module comprises: a network access response frame receiving sub-module configured to receive the network access response frame sent by the relay device within a second receive window after the network access request frame with the first preamble is sent.

Clause 35: The apparatus of Clause 30, wherein the downlink data frame receiving module comprises: a downlink data frame receiving sub-module configured to receive the downlink data frame sent by the relay device within a second receive window after the uplink data frame with the first preamble is sent.

Clause 36: A network access apparatus for a terminal, comprising: a second preamble request frame sending module located at the terminal, configured to send a network access request frame with a second preamble in a normal mode; a first mode switching module located at the terminal, configured to switch from the normal mode to a relay mode if the terminal receives a network access response frame within a second receive window after the network access request frame with the second preamble is sent; a first preamble request frame sending module located at the terminal, configured to send the network access request frame with a first preamble in a relay mode, a length of the second preamble being shorter than a length of the first preamble; and a second mode switching module located at the terminal, configured to switch from the relay mode to the normal mode, if the terminal receives the network access response frame within a first receive window after the network access request frame with the first preamble is sent, or if the terminal does not receive the network access response frame within the first receive window and the second receive window after the network access request frame with the first preamble is sent.

Clause 37: The apparatus of Clause 36, further comprising: a first network access response frame receiving module located at the terminal, configured to receive the network access response frame within the first receive window after sending the network access request frame with the second preamble, and connect to a network in the normal mode.

Clause 38: The apparatus of Clause 36, further comprising: a first network access response frame receiving module located at the terminal, configured to receive the network access response frame within the second receive window after sending the network access request frame with the first preamble, and connect to a network in the relay mode.

Clause 39: A communication apparatus for a terminal and a base station, comprising: a second preamble data frame sending module located at the terminal, configured to send an uplink data frame with the second preamble to the base station in the normal mode if the terminal accesses the network in the normal mode; a first downlink data frame receiving module located at the terminal, configured to receive a downlink data frame returned by the base station; a first preamble data frame sending module located at the terminal, configured to send the uplink data frame with the first preamble to a relay device in the relay mode if the terminal accesses the network in the relay mode, the relay device being configured to replace the first preamble with the second preamble, and forward the uplink data frame with the second preamble to the base station, a length of the second preamble being shorter than a length of the first preamble; and a second downlink data frame receiving module located at the terminal, configured to receive the downlink data frame forwarded by the relay device and returned by the base station.

Clause 40: The apparatus of Clause 39, wherein the first downlink data frame receiving module comprises: a first downlink data frame receiving sub-module, configured to receive the downlink data frame returned by the base station within the first receive window after the uplink data frame with the second preamble is sent.

Clause 41: The apparatus of Clause 39, wherein the second downlink data frame receiving module comprises: a second downlink data frame receiving sub-module, configured to receive the downlink data frame returned by the relay device and returned by the base station within the second receive window after the uplink data frame with the first preamble is sent.

Clause 42: A communication apparatus for a terminal and a base station, comprising: a first preamble request frame receiving module located at a relay device, configured to receive a network access request frame with a first preamble sent by the terminal; a first preamble request frame forwarding module located at the relay device, configured to replace the first preamble with a second preamble, and send the network access request frame with the second preamble to the base station, a length of the second preamble being shorter than a length of the first preamble; and a network access response frame forwarding module located at the relay device, configured to receive a network access response frame returned by the base station, and send the network access response frame to the terminal.

Clause 43: The apparatus of Clause 42, further comprising: a first preamble data frame receiving module located at the relay device, configured to receive an uplink data frame with the first preamble sent by the terminal; a first preamble data frame forwarding module located at the relay device, configured to replace the first preamble with the second preamble, and send an uplink data frame with the second preamble to the base station; and a downlink data frame forwarding module located at the relay device, configured to receive a downlink data frame returned by the base station and send the downlink data frame to the terminal.

Clause 44: The apparatus of Clause 42, wherein the first preamble request frame receiving module comprises: a first preamble detection sub-module, configured to periodically wake up from an intermittent sleep state, and detect whether the first preamble is present when waking up; and a first preamble request frame receiving sub-module, configured to receive the network access request frame after the first preamble if the first preamble is detected.

Clause 45: The apparatus of Clause 44, wherein the network access response frame forwarding module comprises: a network access response frame forwarding sub-module, configured to send the network access response frame to the terminal within a second receive window after the network access request frame with the first preamble is sent by the terminal; and a first sleep sub-module, configured to enter into the intermittent sleep state after sending the network access response frame.

Clause 46: The apparatus of Clause 43, wherein the first preamble data frame receiving module comprises: a second preamble detection sub-module, configured to periodically wake up from an intermittent sleep state, and detect whether the first preamble is present when waking up; and a first preamble data frame receiving sub-module, configured to receive the uplink data frame after the first preamble if the first preamble is detected.

Clause 47: The apparatus of Clause 46, wherein the downlink data frame forwarding module comprises: a downlink data frame forwarding sub-module, configured to send the downlink data frame to the terminal within a second receive window after the uplink data frame with the first preamble is sent by the terminal; and a second sleep sub-module, configured to enter into the intermittent sleep state after the downlink data frame is sent.

Clause 48: The apparatus of Clause 44, wherein a wake-up period of the relay device is shorter than the length of the first preamble.

Clause 49: A network access apparatus for a terminal, comprising: a first preamble request frame receiving module located at a relay device, configured to receive a network access request frame with a first preamble sent by the terminal in a relay mode; a first preamble request frame forwarding module located at the relay device, configured to replace the first preamble with a second preamble, and send the network access request frame with the second preamble to a base station, a length of the second preamble being shorter than a length of the first preamble; and a network access response frame forwarding module located at the relay device, configured to receive a network access response frame returned by the base station, and send the network access response frame to the terminal.

Clause 50: The apparatus of Clause 49, wherein the first preamble request frame receiving module comprises: a first preamble detection sub-module, configured to periodically wake up from an intermittent sleep state, and detect whether the first preamble is present when waking up; and a first preamble request frame receiving sub-module is configured to cause the relay device to receive the network access request frame after the first preamble if the first preamble is detected.

Clause 51: The apparatus of Clause 49, wherein the network access response frame forwarding module comprises: a network access response frame forwarding sub-module, configured to send the network access response frame to the terminal within the second receive window after the network access request frame with the first preamble is sent by the terminal; and a sleep sub-module, configured to enter into the intermittent sleep state after the network access response frame is sent.

Clause 52: The apparatus of Clause 50, wherein a wake-up period of the relay device is shorter than the length of the first preamble.

Clause 53: A communication apparatus for a terminal and a base station, comprising: a first preamble data frame receiving module located at a relay device, configured to receive an uplink data frame with a first preamble sent by a terminal that connects to a network in a relay mode; a first preamble data frame forwarding module located at the relay device, configured to replace the first preamble with a second preamble, and send the uplink data frame with the second preamble to the base station, a length of the second preamble being shorter than a length of the first preamble; and a downlink data frame forwarding module located at the relay device, configured to receive a downlink data frame returned by the base station, and forward the downlink data frame to the terminal.

Clause 54: The apparatus of Clause 53, wherein the first preamble data frame receiving module comprises: a first preamble detection sub-module, configured to periodically wake up from an intermittent sleep state, and detect whether the first preamble is present when waking up; a first preamble data frame receiving sub-module is configured to cause the relay device to receive the uplink data frame after the first preamble if the first preamble is detected.

Clause 55: The apparatus of Clause 54, wherein the downlink data frame forwarding module comprises: a downlink data frame forwarding sub-module, configured to send the downlink data frame to the terminal within a second receive window after the uplink data frame with the first preamble is sent by the terminal; and a sleep sub-module, configured to enter into the intermittent sleep state after the downlink data frame is sent.

Clause 56: The apparatus of Clause 54, wherein a wake-up period of the relay device is shorter than the length of the first preamble.

Clause 57: An apparatus, comprising: one or more processors; and one or more machine-readable media having instructions stored thereon that, when executed by the one or more processors, cause the apparatus to perform one or more of the methods of Clauses 1-7, 8-10, 11-13, 14-20, 21-24, or 25-28.

Clause 58: One or more machine-readable media having instructions stored thereon that, when executed by one or more processors, cause an apparatus to perform one or more of the methods of Clauses 1-7, 8-10, 11-13, 14-20, 21-24, or 25-28.

What is claimed is:

1. A method implemented by a terminal, the method comprising:
   sending a network access request frame with a first preamble to a first device, the first device being configured to receive the network access request frame according to the first preamble, send the network access request frame with a second preamble to a gateway, and receive a network access response frame returned by the gateway, a length of the second preamble being smaller than a length of the first preamble, the length of the first preamble being longer than a first period of the first device to activate the first device in a first mode; and
   receiving the network access response frame sent by the first device.

2. The method of claim 1, further comprising:
   sending an uplink data frame with the first preamble to the first device, the first device being further configured to receive the uplink data frame according to the first preamble, send the uplink data frame with the second preamble to the gateway, and receive a downlink data frame returned by the gateway; and
   receiving the downlink data frame sent by the first device.

3. The method of claim 2, wherein receiving the downlink data frame sent by the first device comprises:
   receiving the downlink data frame sent by the first device within a second receive window after the uplink data frame with the first preamble is sent.

4. The method of claim 1, wherein sending the network access request frame with the first preamble to the first device comprises:
   sending a new network access request frame with the first preamble to the first device, in response to determining that the terminal does not receive the network access response frame within a first receive window and a second receive window after the network access request frame with the second preamble is sent.

5. The method of claim 1, wherein sending the network access request frame with the first preamble to the first device comprises:
   sending a new network access request frame with the first preamble to the first device, in response to determining that the terminal receives the network access response frame within a second receive window after sending the network access request frame with the second preamble.

6. The method of claim 1, further comprising:
   sending a new network access request frame with the second preamble to the gateway, in response to determining that the terminal receives a network access request frame within a first receive window after the network access request frame with the first preamble is sent.

7. The method of claim 5, further comprising:
   sending the new network access request frame with the second preamble, in response to determining that the terminal does not receive the network access response frame within the first receive window and a second receive window after the network access request frame with the first preamble is sent.

8. The method of claim 1, wherein receiving the network access response frame sent by the first device comprises:
   receiving the network access response frame that is sent by the first device within a second receive window after the network access request frame with the first preamble is sent.

9. One or more computer readable media storing executable instructions that, when executed by one or more processors of a terminal, cause the one or more processors to perform acts comprising:
   sending a network access request frame with a second preamble in a normal mode;
   switching from the normal mode to a relay mode, in response to determining that the terminal receives a network access response frame within a second receive window after the network access request frame with the second preamble is sent;
   sending the network access request frame with a first preamble in a relay mode, a length of the second preamble being smaller than a length of the first preamble; and
   switching from the relay mode to the normal mode, in response to determining that the terminal receives a network access response frame within a first receive window after the network access request frame with the first preamble is sent, or in response to determining that the terminal does not receive the network access response frame within the first receive window and the second receive window after the network access request frame with the first preamble is sent.

10. The one more computer readable media of claim 9, the acts further comprising:

receiving the network access response frame within the first receive window after sending the network access request frame with the second preamble, and entering a network in the normal mode.

11. The one more computer readable media of claim 9, the acts further comprising:
the terminal receiving the network access response frame within the second receive window after the network access request frame with the first preamble is sent, and connecting to a network in the relay mode.

12. The one more computer readable media of claim 9, the acts further comprising:
sending an uplink data frame with the second preamble to the gateway in the normal mode, if the terminal connects to a network in the normal mode;
receiving a downlink data frame returned by the gateway;
sending the uplink data frame with the first preamble to the first device in the relay mode, in response to determining that the terminal accesses the network in the relay mode, the first device being configured to use the second preamble to replace the first preamble, and forward the uplink data frame with the second preamble to the gateway, a length of the second preamble being shorter than a length of the first preamble; and
receiving a downlink data frame forwarded by the first device and returned by the gateway.

13. The one more computer readable media of claim 12, wherein receiving the downlink data frame returned by the gateway comprises:
receiving the downlink data frame returned by the gateway within a first receive window after the uplink data frame with the second preamble is sent.

14. The one more computer readable media of claim 12, wherein receiving the downlink data frame forwarded by the first device and returned by the gateway comprises:
receiving the downlink data frame forwarded by the first device and returned by the gateway within a second receive window after the uplink data frame with the first preamble is sent.

15. An apparatus implemented by a first device,
the apparatus comprising: one or more processors;
memory;
a first preamble request frame receiving module stored in the memory and executable by the one or more processors to receive a network access request frame with a first preamble sent by the terminal, a length of the first preamble being longer than a first period of the first device to activate the first device in a first mode;
a first preamble request frame forwarding module stored in the memory and executable by the one or more processors to replace the first preamble with a second preamble, and send the network access request frame with the second preamble to a gateway, a length of the second preamble being shorter than a length of the first preamble; and
a network access response frame forwarding module stored in the memory and executable by the one or more processors to receive a network access response frame returned by the gateway, and send the network access response frame to the terminal.

16. The apparatus of claim 15, further comprising:
a first preamble data frame receiving module to receive an uplink data frame with the first preamble sent by the terminal;
a first preamble data frame forwarding module to replace the first preamble with the second preamble, and send an uplink data frame with the second preamble to the gateway; and
a downlink data frame forwarding module to receive a downlink data frame returned by the gateway and send the downlink data frame to the terminal.

17. The apparatus of claim 15, wherein the first preamble request frame receiving module comprises:
a first preamble detection sub-module to periodically wake up from an intermittent sleep state, and detect whether the first preamble is present when waking up; and
a first preamble request frame receiving sub-module to receive the network access request frame after the first preamble in response to determining that the first preamble is detected.

18. The apparatus of claim 17, wherein the network access response frame forwarding module comprises:
a network access response frame forwarding sub-module to send the network access response frame to the terminal within a second receive window after the network access request frame with the first preamble is sent by the terminal; and
a first sleep sub-module to enter into the intermittent sleep state after sending the network access response frame.

19. The apparatus of claim 15, wherein the first preamble data frame receiving module comprises:
a second preamble detection sub-module to periodically wake up from an intermittent sleep state, and detect whether the first preamble is present when waking up; and
a first preamble data frame receiving sub-module to receive the uplink data frame after the first preamble in response to determining that the first preamble is detected.

20. The apparatus of claim 19, wherein the downlink data frame forwarding module comprises:
a downlink data frame forwarding sub-module to send the downlink data frame to the terminal within a second receive window after the uplink data frame with the first preamble is sent by the terminal; and
a second sleep sub-module to enter into the intermittent sleep state after the downlink data frame is sent.

* * * * *